(12) United States Patent
Seitz et al.

(10) Patent No.: US 11,346,914 B2
(45) Date of Patent: *May 31, 2022

(54) RFID ANTENNA ARRAY FOR GAMING

(71) Applicant: FORTISS, LLC, Los Angeles, CA (US)

(72) Inventors: Forrest S. Seitz, Beaverton, OR (US); Joshua K. Hoyt, Portland, OR (US); Bartley A. Johnson, West Linn, OR (US); Tyler J. Seitz, Portland, OR (US)

(73) Assignee: FORTISS, LLC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/028,626

(22) Filed: Sep. 22, 2020

(65) Prior Publication Data

US 2021/0011107 A1 Jan. 14, 2021

Related U.S. Application Data

(63) Continuation-in-part of application No. 16/576,437, filed on Sep. 19, 2019, now Pat. No. 10,782,382.
(Continued)

(51) Int. Cl.
*G01S 3/04* (2006.01)
*G07F 17/32* (2006.01)
(Continued)

(52) U.S. Cl.
CPC ............. *G01S 3/043* (2013.01); *A47B 25/00* (2013.01); *A63F 3/00157* (2013.01);
(Continued)

(58) Field of Classification Search
CPC ....... A63F 2003/00164; A63F 3/00157; G07F 17/322; G06K 7/10356; A47B 25/00; G01S 3/043

See application file for complete search history.

(56) References Cited

U.S. PATENT DOCUMENTS 8,981,940 B2 * 3/2015 Hoyt .................. G06K 19/047
340/572.7
9,720,505 B2 * 8/2017 Gribetz ............... G06F 3/04815
(Continued)

FOREIGN PATENT DOCUMENTS

CN 1954507 A 4/2007
CN 105760799 A 7/2016
(Continued)

OTHER PUBLICATIONS

Co-Pending Taiwan Application No. 107138916, Office Action dated Aug. 20, 2019. Both original Taiwan and English translations.
(Continued)

*Primary Examiner* — Joseph H Feild
*Assistant Examiner* — Rufus C Point
(74) *Attorney, Agent, or Firm* — Fountainhead Law Group, PC

(57) ABSTRACT

An RFID system includes multiple antennas and uses amplitude and phase information of the RFID signals received by each antenna to determine the position of RFID tags in the vicinity. More than one antenna can receive the RFID signals during a single read cycle, enabling the RFID system to operate more quickly than a system that energizes antennas separately.

20 Claims, 25 Drawing Sheets

Related U.S. Application Data which is a continuation-in-part of application No. 16/402,776, filed on May 3, 2019, now Pat. No. 10,948,562, which is a continuation of application No. 16/114,018, filed on Aug. 27, 2018, now Pat. No. 10,324,157, which is a continuation of application No. 15/814,170, filed on Nov. 15, 2017, now Pat. No. 10,088,547.

(51) Int. Cl.
```
A47B 25/00      (2006.01)
A63F 3/00       (2006.01)
G01S 13/82      (2006.01)
G01S 13/87      (2006.01)
G06K 7/10       (2006.01)
```

(52) U.S. Cl.
CPC ............ *G01S 13/82* (2013.01); *G01S 13/878* (2013.01); *G06K 7/10356* (2013.01); *G07F 17/322* (2013.01); *A63F 2003/00164* (2013.01)

(56) References Cited

U.S. PATENT DOCUMENTS

| | | | | |
|---|---|---|---|---|
| 10,088,547 | B1 * | 10/2018 | Seitz | G07F 17/322 |
| 2003/0189514 | A1 * | 10/2003 | Miyano | H01Q 1/245 |
| | | | | 342/372 |
| 2004/0056781 | A1 | 3/2004 | Rix et al. | |
| 2004/0124840 | A1 * | 7/2004 | Reykowski | G01R 33/3415 |
| | | | | 324/318 |
| 2004/0229682 | A1 * | 11/2004 | Gelinotte | G07F 17/32 |
| | | | | 463/25 |
| 2006/0017634 | A1 * | 1/2006 | Meissner | G06K 7/10356 |
| | | | | 343/742 |
| 2006/0187051 | A1 | 8/2006 | Wu et al. | |
| 2007/0035399 | A1 | 2/2007 | Hecht et al. | |
| 2007/0057469 | A1 * | 3/2007 | Grauzer | G07F 17/322 |
| | | | | 273/309 |
| 2009/0073066 | A1 * | 3/2009 | Jordon | H01Q 13/10 |
| | | | | 343/770 |
| 2009/0117967 | A1 * | 5/2009 | Koyama | G07F 17/32 |
| | | | | 463/17 |
| 2010/0079252 | A1 | 4/2010 | Tsujimoto | |
| 2010/0105477 | A1 | 4/2010 | Chang et al. | |
| 2010/0176924 | A1 | 7/2010 | Seitz et al. | |
| 2013/0233923 | A1 | 9/2013 | Hoyt et al. | |
| 2015/0141126 | A1 * | 5/2015 | Hoyt | G07F 17/3248 |
| | | | | 463/25 |
| 2015/0312517 | A1 | 10/2015 | Hoyt et al. | |
| 2016/0217645 | A1 * | 7/2016 | Seitz | G07F 17/3225 |
| 2017/0132438 | A1 * | 5/2017 | Cletheroe | G06K 7/10158 |
| 2017/0228630 | A1 * | 8/2017 | Hoyt | G06K 19/0723 |
| 2019/0146051 | A1 * | 5/2019 | Seitz | G01S 3/043 |
| | | | | 340/686.1 |
| 2020/0018810 | A1 * | 1/2020 | Seitz | G01S 3/043 |
| 2021/0011107 | A1 * | 1/2021 | Seitz | A47B 25/00 |

FOREIGN PATENT DOCUMENTS

| | | |
|---|---|---|
| JP | H1138877 A | 2/1999 |
| TW | 200620135 A | 6/2006 |
| TW | 200932316 A | 8/2009 |
| TW | 201016290 A | 5/2010 |
| TW | 201132390 A | 10/2011 |

OTHER PUBLICATIONS

Co-Pending Indian Application No. 201844041574, First Examination Report dated Aug. 24, 2021; 6 pages.
Co-Pending Taiwan Application No. 109113004, Office Action dated Nov. 16, 2020. Both original Taiwan and English translations.
Co-pending Chinese Application No. 201811358220.6, First Office Action with Search Report dated Nov. 3, 2021. Both original Chinese and English Translations.

* cited by examiner

Antenna Group 2300

RFID ANTENNA ARRAY FOR GAMING

CROSS REFERENCE TO RELATED APPLICATIONS

The present application is a continuation-in-part of U.S. patent application Ser. No. 16/576,437 filed Sep. 19, 2019 for "RFID Antenna Array For Gaming", which is a continuation-in-part of U.S. patent application Ser. No. 16/402,776 filed May 3, 2019 for "RFID Antenna Array For Gaming", which is a continuation of U.S. patent application Ser. No. 16/114,018 filed Aug. 27, 2018 for "RFID Antenna Array For Gaming", which is a continuation of U.S. patent application Ser. No. 15/814,170 filed Nov. 15, 2017 for "RFID Antenna Array For Gaming", all of which are incorporated herein by reference.

BACKGROUND

The present invention relates to gaming, and in particular, to a radio frequency identification (RFID) system with an antenna array for detecting the locations of RFID tags on a gaming table.

Unless otherwise indicated herein, the approaches described in this section are not prior art to the claims in this application and are not admitted to be prior art by inclusion in this section.

Tracking the location of gaming tokens in real-time on a gaming table has the potential to revolutionize the gaming industry by providing cash management and improved security. Tying this data to specific players allows casinos to create accurate player profiles while simultaneously alleviating the pit boss of mundane tasks that take years of training to hone.

Traditional RFID systems have tried to address the gaming market with limited success. In a typical RFID system, the excitation antenna defines a "working volume" within which the energy projected by the antenna is sufficient to power the RFID tag. This "working volume" is generally poorly defined with the only option to increase/decrease power to adjust the read range. But doing so extends the read range in ALL directions, introducing cross-talk errors when multiple antennas are in close proximity. Existing products on the market suffer from multiple shortcomings. First, they are limited to discrete betting spots. Second, they are limited in the chip stack heights they can read. Third, they have very poor discrimination between adjacent betting spots. Fourth, they have higher than acceptable read errors. Fifth, they have slow read rates that miss important events (e.g., placement and removal of chips, etc.).

These shortcomings limit the available technology to games where the betting spots are widely separated (e.g. a single "pot"), to detecting initial bets only (not capturing transient events such as payouts), and identifying counterfeit tokens only prior to their use on a table (not during gameplay).

U.S. Application Pub. No. 2013/0233923 discusses a ferrite core technology. The ferrite core technology overcomes many of the above-noted shortcomings, but does not address the need to track multiple separate bets placed by different bettors on a single larger betting spot (such as when "back bettors" share a betting spot with seated bettors on traditional Baccarat "racetrack" layouts). Also needed is the ability to discriminate the location of very closely spaced bets (such as can be found on a roulette table).

U.S. Application Pub. No. 2017/0228630 discusses a solution involving two intersecting antenna arrays. One array of horizontal antennas provides one coordinate, and a second array of vertical antennas provides a second coordinate. Signal strength information comparing adjacent antennas may then be used to interpolate a higher fidelity set of coordinates.

Although the approach of U.S. Application Pub. No. 2017/0228630 does work, it suffers from the simple fact that reading RFID tags takes time—and reading tags multiple times for purposes of interpolation multiplies the required time such that capturing an accurate "snapshot" of transient events with large numbers of tags may not practical in certain gaming environments.

The typical RFID system addresses the question, "Who's there?" The response is a series of unique item identifiers (e.g., serial numbers). As discussed above, the ferrite core technology discussed in U.S. Application Pub. No. 2013/0233923 is directed to addressing the additional question "Where are you?" as a way to track individual bets.

U.S. Application Pub. No. 2016/0217645 discusses using a network analyzer device prior to an RFID read, thereby being able to direct the RFID reader to only those antennas with tags present. This describes a serial approach that eliminates the "overhead" of looking for tags using an RFID reader where none are present, as using the network analyzer device takes less time than using the RFID reader.

Both U.S. Application Pub. No. 2013/0233923 and U.S. Application Pub. No. 2016/0217645 involve the placement of bets in specific areas (the betting spots). RFID tags not placed in one of the defined areas will not be read correctly. Neither of these disclosures addresses the need to detect bets placed anywhere on a larger bounded area. The additional disclosure of U.S. Application Pub. No. 2017/0228630 does address placing multiple bets within a larger bounded area. However, the system disclosed therein involved multiple RFID reads to define the coordinates of each bet, which is a time consuming process.

All three of U.S. Application Pub. No. 2013/0233923, U.S. Application Pub. No. 2016/0217645 and U.S. Application Pub. No. 2017/0228630 describe systems to identify and locate RFID tags by using signal strength information as measured by the RFID reader to determine proximity to a specific antenna. U.S. Application Pub. No. 2013/0233923 describes a system that increases the signal strength at the proper antenna, which further improves accuracy.

SUMMARY

One issue with existing systems that use an array of antennas to locate a tag within the array is the time involved in energizing each antenna, in order to read the RFID tags in the vicinity of each antenna and then repeat this process for each subsequent antenna. There is a need for a faster method to accurately locate and track individual closely spaced bets that can be placed anywhere within a defined boundary on a gaming table. There is a need for increased speed in a system that applies game rules to calculate the amounts and positions of the original bets, and also to correlate transient events such as payouts to winning bets.

Given the above, embodiments are directed toward using phase information of the detected RFID signals in order to improve the operation of the system.

According to an embodiment, a system determines the locations of objects in a gaming environment. The system includes a main antenna associated with an area on a gaming table, a first plurality of antennas oriented in a first direction and associated with the area on the gaming table, a second plurality of antennas oriented in a second direction, a main radio frequency identification (RFID) transmitter coupled to the main antenna, a main RFID receiver coupled to the main antenna, a first plurality of RFID receivers coupled to the first plurality of antennas, a second plurality of RFID receivers coupled to the second plurality of antennas, and a controller that controls the main RFID transmitter to generate an RFID inventory command. The second direction differs from the first direction, the second plurality of antennas overlaps the first plurality of antennas, the first plurality of antennas and the second plurality of antennas intersect at a plurality of locations within the area, and each of a plurality of RFID tags in the area responds to the RFID inventory command according to an anti-collision process. In response to the RFID inventory command, the main RFID receiver receives a first plurality of responses from the plurality of RFID tags, the first plurality of RFID receivers receives a second plurality of responses from the plurality of RFID tags, and the second plurality of RFID receivers receives a third plurality of responses from the plurality of RFID tags. The controller determines an identifier for each of the plurality of RFID tags using at least one of the first plurality of responses, the second plurality of responses, and the third plurality of responses, and the controller determines a position of each of the plurality of RFID tags by correlating amplitude information and phase information of the first plurality of responses, amplitude information and phase information of the second plurality of responses, and amplitude information and phase information of the third plurality of responses.

For a particular RFID tag of the plurality of RFID tags, the controller may simultaneously determine the identifier and the position of the particular RFID tag.

The RFID inventory command may be a single RFID inventory command that results in the controller determining the identifiers and the positions of all the plurality of RFID tags.

The first plurality of antennas and the second plurality of antennas may be overlapping and intersecting to define the position of each of the plurality of RFID tags in two dimensions within the area. The first plurality of antennas and the second plurality of antennas may intersect orthogonally and define the position of each of the plurality of RFID tags in an x dimension and a y dimension within the area.

The first plurality of antennas and the second plurality of antennas may define the position of each of the plurality of RFID tags using polar coordinates within the area.

The first plurality of antennas may be formed as a first non-overlapping, single layer, and the second plurality of antennas may be formed as a second non-overlapping, single layer. The first plurality of antennas may be formed as an overlapping, dual layer.

The controller may determine the position of each of the plurality of RFID tags using interpolation of the amplitude information of the second plurality of responses and the amplitude information of the third plurality of responses.

The controller may determine that a subset of the plurality of RFID tags are grouped together when the position of each RFID tag of the subset is within a defined range of at least one other RFID tag of the subset.

The controller may determine that a first subset of the plurality of RFID tags corresponds to a bet, and that a second subset of the plurality of RFID tags corresponds to a payout associated with the bet, according to the position of the first subset and the position of the second subset.

The controller may determine the identifier for each of the plurality of RFID tags using at least one of the second plurality of responses and the third plurality of responses.

The controller may use the first plurality of responses as reference information to normalize the second plurality of responses and the third plurality of responses. The controller may use the amplitude information of the first plurality of responses to normalize the amplitude information of the second plurality of responses and the amplitude information of the third plurality of responses.

The controller may use the phase information of the first plurality of responses to determine relative phase information for the second plurality of responses and relative phase information for the third plurality of responses.

When a first set of the plurality of RFID tags are associated with a first position, and when a second set of the plurality of RFID tags are associated with a second position, the controller may determine that the first set and the second set are a group when the first position and the second position are within a threshold distance.

According to an embodiment, a system determines the locations of objects in a gaming environment. The system includes a main antenna associated with an area on a gaming table, a first plurality of antennas oriented in a first direction and associated with the area on the gaming table, a second plurality of antennas oriented in a second direction, a main radio frequency identification (RFID) transmitter coupled to the main antenna, a main RFID receiver coupled to the main antenna, a first plurality of RFID receivers coupled to the first plurality of antennas, a second plurality of RFID receivers coupled to the second plurality of antennas, and a controller that controls the main RFID transmitter to generate an RFID inventory command. The second direction differs from the first direction, the second plurality of antennas overlaps the first plurality of antennas, and the first plurality of antennas and the second plurality of antennas intersect at a plurality of locations within the area. Each of a plurality of RFID tags in the area responds to the RFID inventory command according to an anti-collision process. In response to the RFID inventory command, the main RFID receiver receives a first plurality of responses from the plurality of RFID tags, the first plurality of RFID receivers receives a second plurality of responses from the plurality of RFID tags, and the second plurality of RFID receivers receives a third plurality of responses from the plurality of RFID tags. The controller determines an identifier for each of the plurality of RFID tags using at least one of the first plurality of responses, the second plurality of responses, and the third plurality of responses. The controller determines a position of each of the plurality of RFID tags by correlating amplitude information of the first plurality of responses, amplitude information and phase information of the second plurality of responses, and amplitude information and phase information of the third plurality of responses.

The details of this embodiment may otherwise be similar to the details of the previous embodiment.

According to an embodiment, a method determines the locations of objects in a gaming environment. The method includes generating, by a main radio frequency identification (RFID) transmitter coupled to a main antenna, an RFID inventory command, where the main antenna is associated with an area on a gaming table. The method further includes responding, by each of a plurality of RFID tags in the area, to the RFID inventory command according to an anti-collision process. The method further includes receiving, by a main RFID receiver coupled to the main antenna, a first plurality of responses from the plurality of RFID tags in the area in response to the RFID inventory command. The method further includes receiving, by a first plurality of RFID receivers coupled to a first plurality of antennas, a second plurality responses from the plurality of RFID tags in response to the RFID inventory command, where the first plurality of antennas is oriented in a first direction and is associated with the area on the gaming table. The method further includes receiving, by a second plurality of RFID receivers coupled to a second plurality of antennas, a third plurality of responses from the plurality of RFID tags in response to the RFID inventory command, where the second plurality of antennas is oriented in a second direction that differs from the first direction, where the second plurality of antennas overlaps the first plurality of antennas, and where the first plurality of antennas and the second plurality of antennas intersect at a plurality of locations within the area. The method further includes determining, by a controller, an identifier for each of the plurality of RFID tags using at least one of the first plurality of responses, the second plurality of responses, and the third plurality of responses. The method further includes determining, by the controller, a position of each of the plurality of RFID tags by correlating amplitude information of the first plurality of responses, amplitude information and phase information of the second plurality of responses, and amplitude information and phase information of the third plurality of responses.

The step of determining the position of each of the plurality of RFID tags may further include determining, by the controller, the position of each of the plurality of RFID tags by correlating the amplitude information and phase information of the first plurality of responses, the amplitude information and phase information of the second plurality of responses, and the amplitude information and phase information of the third plurality of responses.

The details of this embodiment may otherwise be similar to the details of the previous embodiments.

According to an embodiment, a system determines the locations of objects in a gaming environment. The system includes a main antenna associated with an area on a gaming table, a first plurality of antennas oriented in a first direction and associated with the area on the gaming table, and a second plurality of antennas oriented in a second direction, a main radio frequency identification (RFID) transmitter coupled to the main antenna, a first plurality of RFID receivers coupled to the first plurality of antennas, a second plurality of RFID receivers coupled to the second plurality of antennas, and a controller. The second direction differs from the first direction, the second plurality of antennas overlaps the first plurality of antennas, and the first plurality of antennas and the second plurality of antennas intersect at a plurality of locations within the area. The controller controls the main RFID transmitter to generate an RFID inventory command, where each of a plurality of RFID tags in the area responds to the RFID inventory command according to an anti-collision process. In response to the RFID inventory command, the first plurality of RFID receivers receives a first plurality of responses from the plurality of RFID tags, and the second plurality of RFID receivers receives a second plurality of responses from the plurality of RFID tags. The controller determines an identifier for each of the plurality of RFID tags using at least one of the first plurality of responses and the second plurality of responses. The controller determines a position of each of the plurality of RFID tags by correlating amplitude information of the first plurality of responses, and amplitude information of the second plurality of responses.

The controller may determine the position of each of the plurality of RFID tags by correlating the amplitude information and phase information of the first plurality of responses, and the amplitude information and phase information of the second plurality of responses.

The details of this embodiment may otherwise be similar to the details of the previous embodiments.

According to an embodiment, a method determines the locations of objects in a gaming environment. The method includes generating, by a main radio frequency identification (RFID) transmitter coupled to a main antenna, an RFID inventory command, where the main antenna is associated with an area on a gaming table. The method further includes responding, by each of a plurality of RFID tags in the area, to the RFID inventory command according to an anti-collision process. The method further includes receiving, by a first plurality of RFID receivers coupled to a first plurality of antennas, a first plurality responses from the plurality of RFID tags in response to the RFID inventory command, where the first plurality of antennas is oriented in a first direction and is associated with the area on the gaming table. The method further includes receiving, by a second plurality of RFID receivers coupled to a second plurality of antennas, a second plurality of responses from the plurality of RFID tags in response to the RFID inventory command, where the second plurality of antennas is oriented in a second direction that differs from the first direction, where the second plurality of antennas overlaps the first plurality of antennas, and where the first plurality of antennas and the second plurality of antennas intersect at a plurality of locations within the area. The method further includes determining, by a controller, an identifier for each of the plurality of RFID tags using at least one of the first plurality of responses, and the second plurality of responses. The method further includes determining, by the controller, a position of each of the plurality of RFID tags by correlating amplitude information of the first plurality of responses, and amplitude information of the second plurality of responses.

The step of determining the position of each of the plurality of RFID tags may include determining, by the controller, the position of each of the plurality of RFID tags by correlating the amplitude information and phase information of the first plurality of responses, and the amplitude information and phase information of the second plurality of responses.

The details of this embodiment may otherwise be similar to the details of the previous embodiments.

In one or more of the embodiments discussed herein, the system may determine the position of the RFID tags using phase information, relative phase information, amplitude information, or a combination thereof.

In one or more of the embodiments discussed herein, the main antenna may have a "figure 8" shape. The main antenna may have a first loop and a second loop, where the main antenna is associated with a field, where the first loop is associated with a first phase of the field, where the second loop is associated with a second phase of the field, and wherein the first phase is opposite the second phase. The system may further include a second main antenna located where a first loop of the main antenna crosses a second loop of the main antenna, where the controller controls the main RFID transmitter to generate a second RFID inventory command associated with the second main antenna. The second main antenna may be associated with a null of the main antenna, where the controller controls the main RFID transmitter to selectively generate the RFID inventory command and the second RFID inventory command to overcome the null. One or more of the first plurality of antennas and the second plurality of antennas may cross over both the first loop and the second loop of the main antenna. One or more of the first plurality of antennas and the second plurality of antennas may have the "figure 8" shape. The system may further include conductive traces, where the conductive traces are associated with an interior border of a loop of the main antenna.

One or more of the embodiments discussed herein may include a multiplexer coupled to two or more antennas, and coupled to the RFID receiver, where the two or more antennas are selected from the first plurality of antennas and the second plurality of antennas. The controller may control the multiplexer to selectively connect one of the two or more antennas to the RFID receiver.

In one or more of the embodiments discussed herein, the system may further include one or more outside antennas that are outside of the area, where the controller uses the responses from the outside antennas to exclude a subset of the plurality of RFID tags from being associated with the area.

According to an embodiment, the main antenna may be a plurality of main antennas, each having a "figure 8" shape. This feature may be used with one or more of the other embodiments discussed herein.

According to an embodiment, the antennas forming the antenna array may be formed using antenna groups, wherein the antennas in an antenna group have a reflected binary code arrangement. This feature may be used with one or more of the other embodiments discussed herein.

The following detailed description and accompanying drawings provide a further understanding of the nature and advantages of embodiments of the present invention.

DETAILED DESCRIPTION

Described herein are techniques for location determination of RFID tags. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive- or is intended, such will be specifically noted (e.g., "either A or B", "at most one of A and B").

In this document, the terms "RFID tag", "RFID gaming tag", "RFID chip", "RFID gaming chip", "gaming chip", and "gaming token" are used. Such terms are to be read as being broadly synonymous. (More precisely, an "RFID chip" may be used to refer to the integrated circuit components of the "RFID tag", which also includes additional components such as an antenna, a rigid housing, etc. However, this document is mostly concerned with the broad usage for these terms.) The RFID tag responds to a radio frequency signal from the RFID reader, generally with its serial number or other identifier, enabling the RFID reader to obtain an inventory of the RFID tags in the vicinity. In a gaming context, the RFID gaming tags may be placed on, removed from, or moved around on a gaming table as bets and payouts, according to various game rules. The RFID gaming tags may be marked with a value identifier (e.g., $1).

Figure 1:
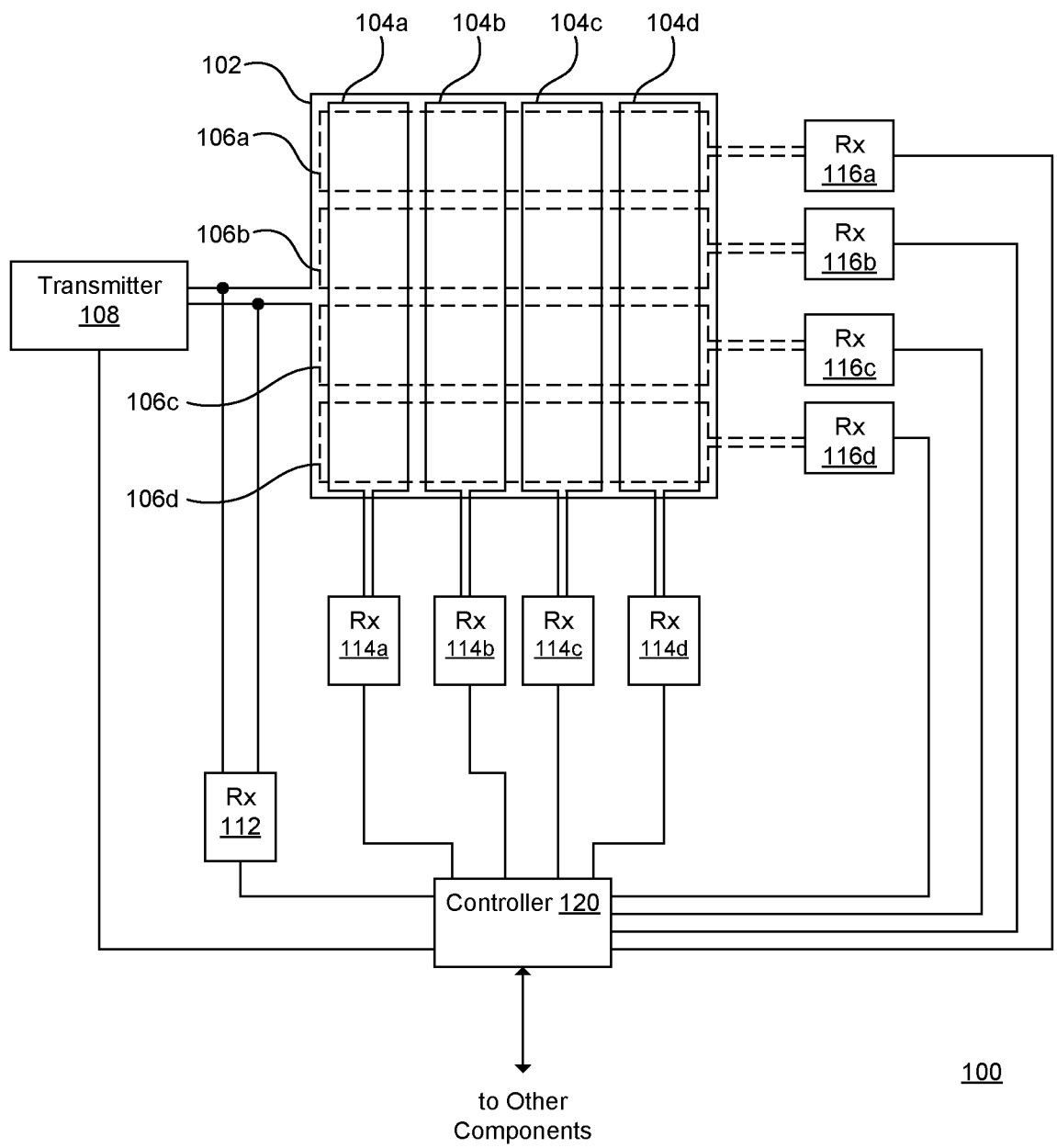
FIG. 1 is a block diagram of an RFID system 100.

FIG. 1 is a block diagram of an RFID system 100. The RFID system 100 includes a main antenna 102, a first set of antennas 104a-104d (collectively antennas 104), a second set of antennas 106a-106d (collectively antennas 106), a main RFID transmitter 108, a main RFID receiver 112, a first set of RFID receivers 114a-114d (collectively RFID receivers 114), a second set of RFID receivers 116a-116d (collectively RFID receivers 116), and a controller 120. In general, the main RFID transmitter 108 generates radio frequency energy that is radiated by the antenna 102 and received by any RFID tags; the responses from the RFID tags are then received by the antennas 102, 104 and 106. The responses from the RFID tags may be amplitude and phase information. The amplitude information may be in the form of received signal strength (RSSI) information, and the phase information may be in the form of in-phase (I) and quadrature (Q) information.

Figure 12A:
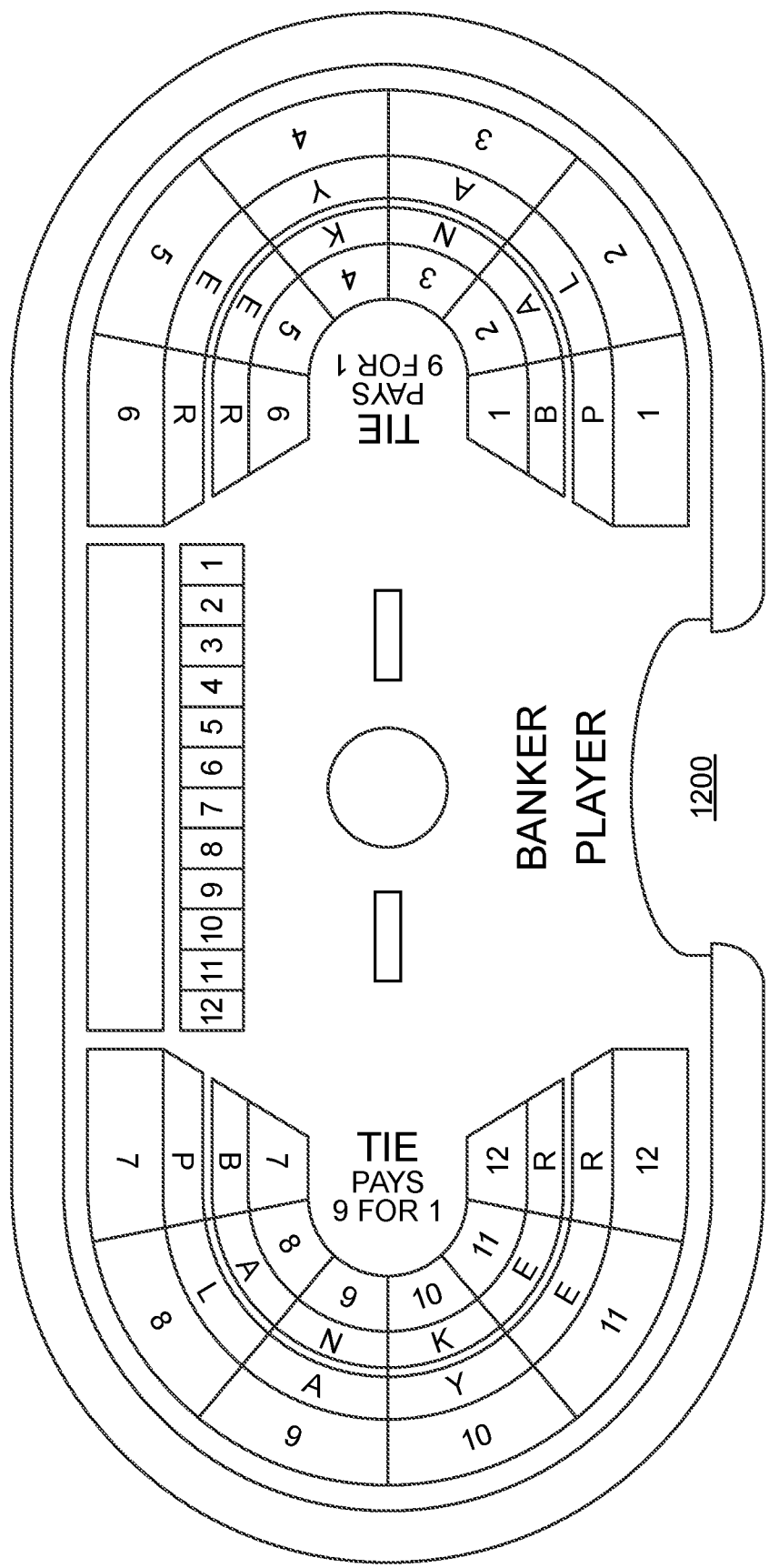
FIG. 12A is an overhead view of a Baccarat table 1200.
Figure 12B:
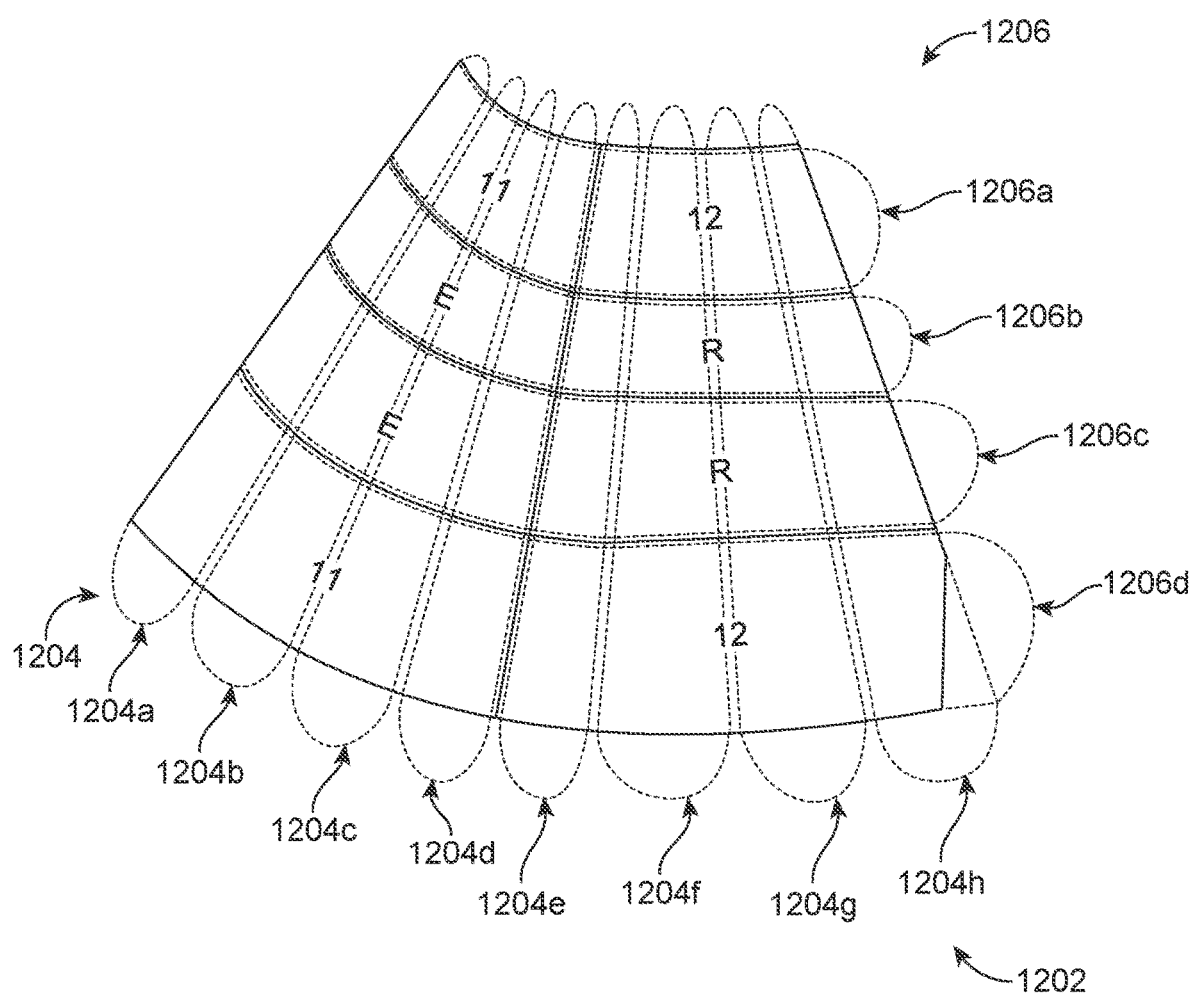
FIG. 12B is an overhead view of a portion of the Baccarat table 1200 showing a corresponding portion of an antenna array 1202.
Figure 13:
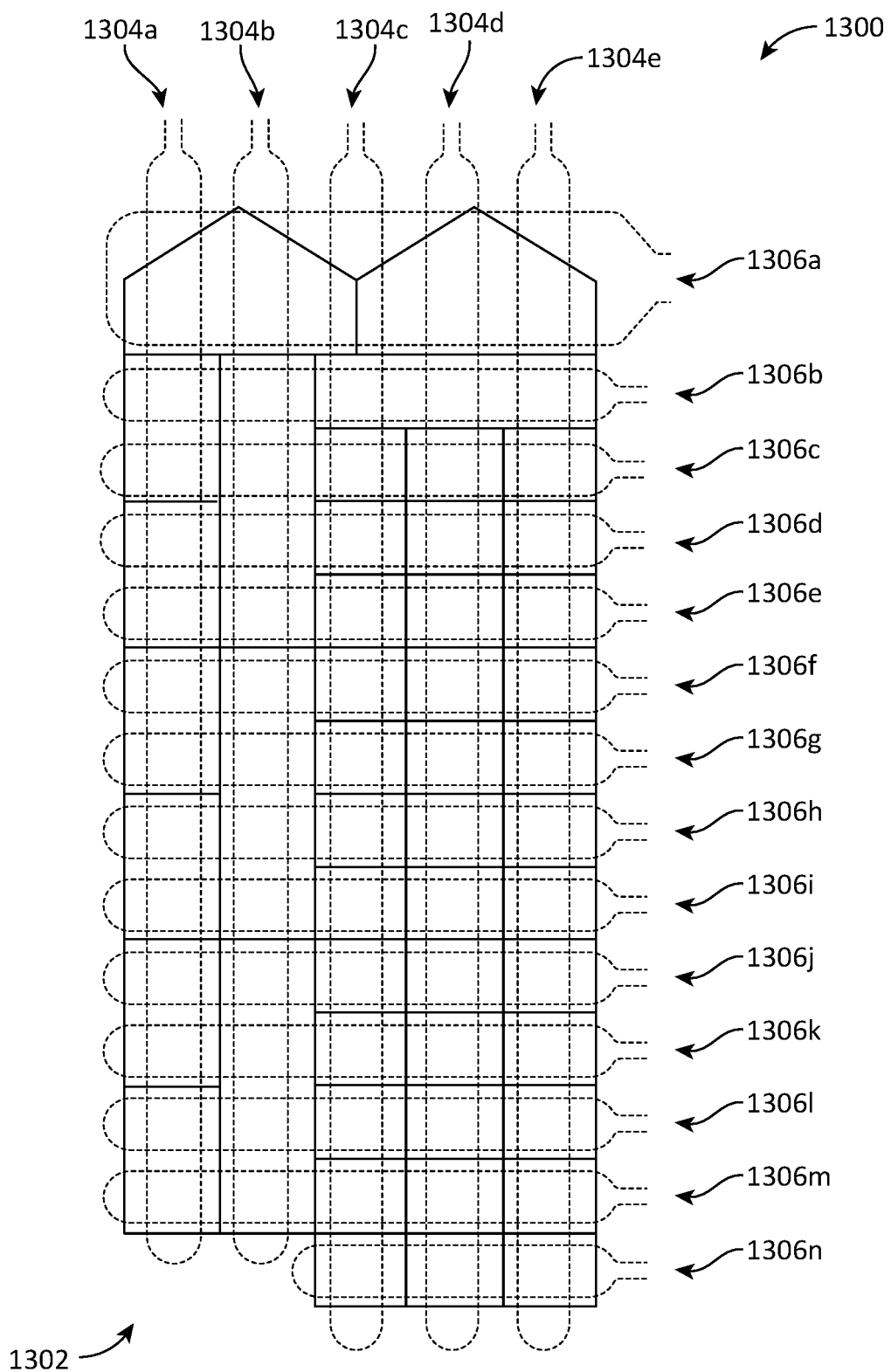
FIG. 13 is an overhead view of a roulette table 1300 having an antenna array 1302.

The RFID system 100 may be implemented as part of a gaming table (see, e.g., the roulette and Baccarat examples of FIGS. 12A-12B and 13). For example, the antennas 102, 104 and 106 may be embedded below the playing surface of the gaming table (in order to detect the locations of the RFID gaming tags during play on the gaming table), and the rest of the components of the RFID system 100 may be embedded within the structure of the gaming table. The gaming environment may have a number of gaming tables, each including an RFID system 100; the multiple RFID systems 100 may be connected to each other or to other components via a network.

The main antenna 102 is located under the playing surface of the gaming table. As part of playing games using the gaming table, RFID gaming tags are placed on, removed from, and moved around on the area above the main antenna 102. This area on the gaming table may be marked to show various subareas according to the particular game being implemented (see, e.g., the roulette and Baccarat examples of FIGS. 12A-12B and 13). The main antenna 102 may be implemented on a printed circuit board. The main RFID transmitter 108 and the main receiver 112 are coupled to the main antenna 102.

The antennas 104 are located under the playing surface of the gaming table and, like the main antenna 102, are associated with the gameplay area. The antennas 104 are oriented in a first direction. As shown in FIG. 1, the antennas 104 are oriented in the north-south (or y) direction. In other implementations, the antennas 104 may be oriented in other directions. The antennas 104 may be implemented on a printed circuit board, or as a layer of a multilayer circuit board that also includes the main antenna 102. The RFID receivers 114 are coupled to the antennas 104.

The antennas 106 are located under the playing surface of the gaming table and, like the main antenna 102, are associated with the gameplay area. The antennas 106 are oriented in a second direction that differs from the first direction of the antennas 104. As shown in FIG. 1, the antennas 106 are oriented in the east-west (or x) direction. In other implementations, the antennas 106 may be oriented in other directions. The antennas 106 may be implemented on a printed circuit board, or as a layer of a multilayer circuit board that also includes the main antenna 102 or the antennas 104. The RFID receivers 116 are coupled to the antennas 106.

The antennas 106 overlap the antennas 104; this overlap is shown using dotted lines in FIG. 1. This overlap generally allows both the antennas 104 and 106 to be associated with the gameplay area, in addition to the main antenna 102. In general, this allows at least three antennas (e.g., the main antenna 102, one of the antennas 104, and one of the antennas 106) to be associated with each location within the gameplay area. The spacing between each of the antennas 104, and the spacing between each of the antennas 106, may be adjusted as desired.

Collectively, the antennas 104 and 106 form what may be referred to as an antenna array. As shown in FIG. 1, the antennas 104 and 106 intersect at right angles. In other implementations, the antennas 104 and 106 may intersect at other angles. As shown in FIG. 1, the antennas 104 and 106 are rectangular in shape. In other implementations, the antennas 104 may have other shapes, such as ring shapes, pie shapes, curved shapes, rounded rectangular shapes, etc. The sizes of the antennas 104 and 106 may be adjusted as desired.

Four antennas 104 and four associated RFID receivers 114, and four antennas 106 and four associated RFID receivers 116, are shown in FIG. 1. These quantities may be adjusted as desired to cover larger or smaller areas and/or to increase or decrease spatial resolution.

In general, the main RFID receiver 112 is used to generate reference amplitude and phase information that the controller 120 uses when processing the amplitude and phase information from the antennas 104 and 106. Although the main RFID receiver 112 is shown as a separate component in FIG. 1, the main RFID receiver 112 may be a subcomponent of the main RFID transmitter 108.

The controller 120 generally controls the operation of the RFID system 100. The controller 120 may be connected to, or may be a component of, a computer (e.g., a personal computer). The controller 120 may connect to other components, or may itself include components, that implement other functions such as RFID tag identification, RFID tag location determination, game rules verification, etc. The controller 120 may access various data stores or databases such as a game rules database, an RFID tag database, etc.

The RFID system 100 generally operates as follows. The transmitter 108 generates a radio frequency signal that is transmitted by the main antenna 102. Any RFID gaming tags in the gameplay area respond to the radio frequency signal. The responses from the RFID gaming tags are received by the main receiver 112 (via the main antenna 102), at least one of the receivers 114 (via at least one of the antennas 104), and at least one of the receivers 116 (via at least one of the antennas 106). The controller 120 determines the position of each RFID gaming tag by correlating the responses received by each of the receivers. More details are provided with reference to FIG. 2.

According to another embodiment, the main receiver 112 may be omitted.

Figure 2:
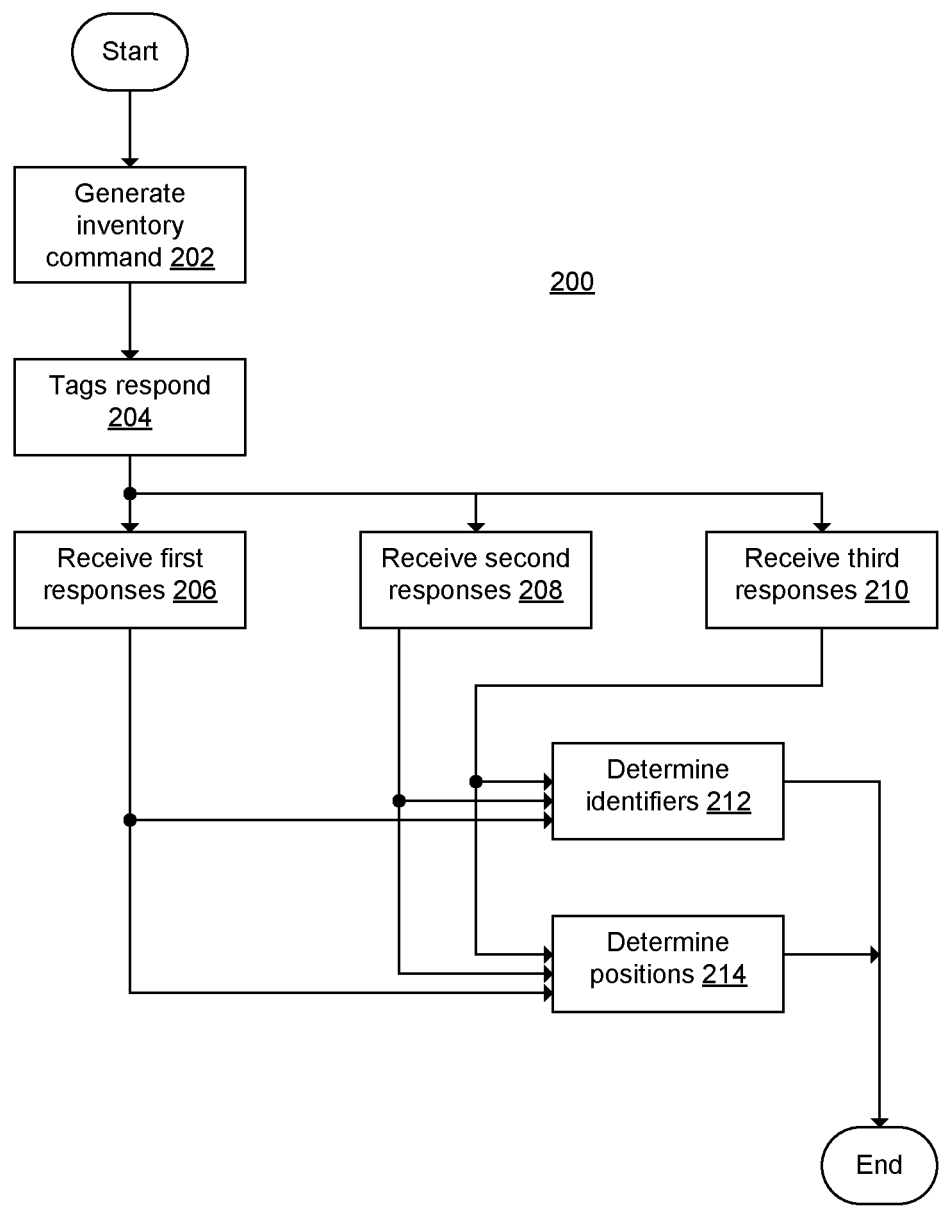
FIG. 2 is a flowchart of a method 200 of operating an RFID system (e.g., the RFID system 100 of FIG. 1).

FIG. 2 is a flowchart of a method 200 of operating an RFID system (e.g., the RFID system 100 of FIG. 1). The method 200 may be controlled by a controller (e.g., the controller 120 of FIG. 1), for example, according to the execution of a computer program. In general, the method 200 describes a single RFID read cycle. Between read cycles, the RFID gaming tags are unpowered and do not send signals. During the RFID read cycle, each RFID gaming tag in the gameplay area responds. The RFID read cycle ends after each RFID gaming tag has responded. Thus, each RFID read cycle results in all the RFID gaming tags in the gameplay responding once but being read by multiple receivers.

At 202, the controller controls a main RFID transmitter (e.g., the main RFID transmitter 108 of FIG. 1) to generate an RFID inventory command. In general, the main RFID antenna is energized, and the RFID inventory command is one of a number of commands that may be included in the radio frequency energy generated by the main RFID transmitter. Further details of the RFID inventory command are provided below. A main antenna (e.g., the main antenna 102 of FIG. 1) coupled to the main RFID transmitter transmits the RFID inventory command. The main antenna is associated with an area on a gaming table that contains one or more RFID tags (e.g., RFID gaming tags).

At 204, each of the RFID tags responds to the RFID inventory command according to an anti-collision process. In general, the anti-collision process helps ensure that only one of the RFID tags is responding at a given time. Further details of the anti-collision process are provided below.

At 206, a main RFID receiver (e.g., the main RFID receiver 112 of FIG. 1) coupled to the main antenna receives a first set of responses from the RFID tags in the area in response to the RFID inventory command.

At 208, a first set of RFID receivers (e.g., the RFID receivers 114 of FIG. 1) coupled to a first set of antennas (e.g., the antennas 104 of FIG. 1) receives a second set of responses from the RFID tags in the area in response to the RFID inventory command. The first set of antennas is oriented in a first direction and is associated with the area on the gaming table.

At 210, a second set of RFID receivers (e.g., the RFID receivers 116 of FIG. 1) coupled to a second set of antennas (e.g., the antennas 106 of FIG. 1) receives a third set of responses from the RFID tags in the area in response to the RFID inventory command. The second set of antennas is oriented in a second direction that differs from the first direction, the second set of antennas overlaps the first set of antennas, and the first set of antennas and the second set of antennas intersect at a number of locations within the area.

As mentioned above, each RFID tag responds once, but each response is received by multiple antennas. For ease of description, these received responses are referred to as the "first set of responses", the "second set of responses" and the "third set of responses" in 206-210 above. In general, each of the multiple antennas receives a particular response simultaneously.

Due to the anti-collision process, ideally only one of the RFID tags is responding at a given time, so controller is able to associate the responses received by each of the antennas at that given time with that one responding RFID tag. So generally 206-210 occur in parallel, with each RFID tag (ideally) responding at a given time and being detected by multiple receivers. For example, at a given time, the response from one RFID tag is received by the main RFID receiver, at least one of the first set of RFID receivers, and at least one of the second set of RFID receivers.

A brief description of the anti-collision process is as follows. The controller puts out a start of inventory command which includes a 5 bit cyclic redundancy check (CRC). This command also defines how many slots there are. The tag creates a random number and compares it to the particular slot number. If it matches then the tag responds with the 5 bit CRC from the command along with the 16 bit CRC of its serial number. If the controller receives this without detecting a collision then it resends the 5 bit CRC and the 16 bit CRC to the tags. The tag then responds by sending out its serial number and sets its flag so it does not respond to more queries until the flag is reset when RF power is removed. Thus, sending the CRC before the actual data speeds things as it is a shorter message to determine if there is a collision.

At 212, a controller (e.g., the controller 120 of FIG. 1) determines an identifier for each of the RFID tags using at least one of the first set of responses, the second set of responses, and the third set of responses. As discussed above, when a given tag responds with its serial number according to the anti-collision process, this response may be received by multiple RFID receivers (e.g., the main RFID receiver receives the first set of responses, including the response from the given tag; the first set of RFID receivers receives the second set of responses, including the response from the given tag; etc.). The controller may use one of the RFID receivers (e.g., the main RFID receiver) to determine the identifiers, and may use the information from the other RFID receivers for verification or confirmation purposes. When the current read cycle ends, the RFID tag loses power, the flag is cleared, and that RFID tag is free to respond during the next read cycle.

At 214, the controller determines a position of each of the RFID tags by correlating amplitude and phase information of the first set of responses with amplitude and phase information of the second set of responses and amplitude and phase information of the third set of responses. Further details of this correlation process are provided below. In general, the controller uses the information from the first set of responses to modify the second set of responses in order to determine one dimension of the position (e.g., the x dimension), and uses the information from the first set of responses to modify the third set of responses in order to determine another dimension of the position (e.g., the y dimension); the intersection of the x dimension and the y dimension then indicates the position of the RFID tag in the gaming area.

As an alternative in 214, the controller may determine a position of each of the RFID tags by correlating amplitude information only (not phase information) of the first set of responses with amplitude and phase information of the second set of responses and amplitude and phase information of the third set of responses. In this alternative, the main RFID receiver just performs excitation, and its amplitude information is used for normalization purposes; the phase information from the first and second sets of antennas is used to determine the position.

As another alternative in 214, the controller may determine a position of each of the RFID tags by correlating amplitude information of the first set of responses with amplitude information of the second set of responses and amplitude information of the third set of responses.

The controller may perform 212-214 in parallel, or may perform 214 prior to 212.

Once all of the RFID tags have responded, the current read cycle is complete. When the controller performs the next read cycle, the controller performs the method 200 again.

The controller may then use the identifier and position of each of the RFID tags to perform other gaming functions such as verifying the amounts and placements of bets and payouts, verifying conformance of the RFID tag placements with various game rules, etc. Further details of these gaming functions are provided below.

As discussed above with reference to FIG. 1, an alternative embodiment omits the main RFID receiver. In such an embodiment, the controller determines the identifier (see 212) and the position (see 214) without using the first set of responses.

Figure 3:
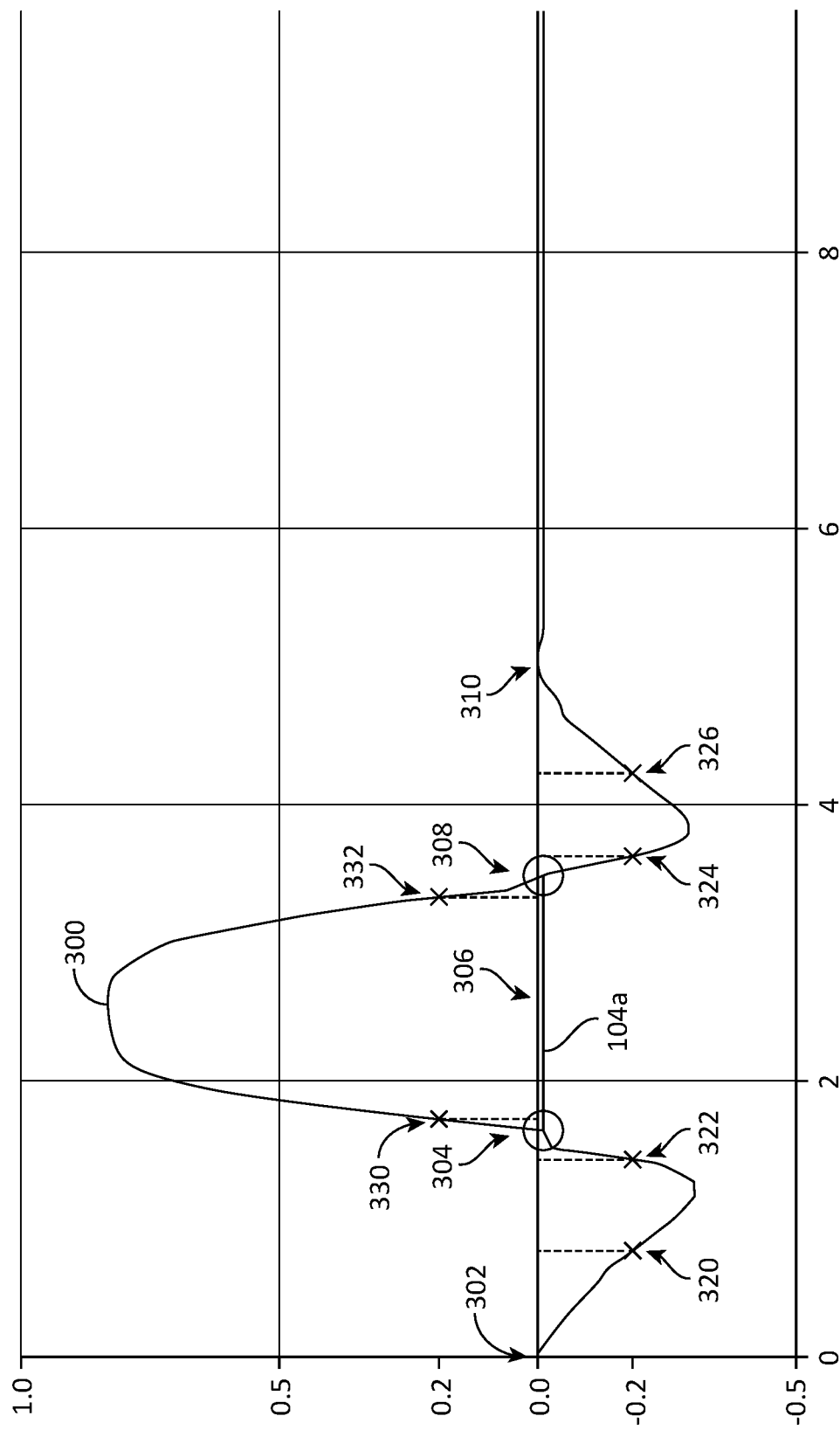
FIG. 3 is a graph showing a plot 300 of amplitude and phase information detected by one of the antennas 104 or 106 (see FIG. 1) as the chip is moved across it.

FIG. 3 is a graph showing a plot 300 of amplitude and phase information detected by one of the antennas 104 or 106 (see FIG. 1) as the chip is moved across it. The plot 300 represents the amplitude and phase information resulting from the response of a single RFID tag at each given x position. For visualization purposes, imagine that we are using the antenna 104a (see FIG. 1) to detect the RFID tag at each position. In FIG. 3, the antenna 104a has a width of approximately 2 inches, positioned between approximately 1.8 and 3.8 inches from the zero position 302. So imagine that the RFID tag starts at the zero position 302. This is outside the antenna 104a and has a zero amplitude, corresponding to the RFID tag not being detected. The left side of the antenna 104a begins at 304. As the RFID tag moves from 302 to 304, the antenna 104a detects the amplitude of the response from the RFID tag, which increases as the RFID tag nears the antenna 104a. (The amplitude shown in FIG. 3 is normalized using the response received by the main antenna 102 of FIG. 1.) Note that the amplitude of the plot 300 is negative between 302 and 304; this is due to the comparison of the phase information for the RFID tag detected by the main antenna 102 versus the antenna 104a. Specifically, the phase information detected by the main antenna 102 is out-of-phase with the phase information detected by this antenna 104a; this out-of-phase result is shown as the negative amplitude in FIG. 3. The negative phase information indicates that the RFID tag is detected outside of the antenna 104a.

When the RFID tag reaches 304 (directly above the left-side loop of the antenna 104a), the amplitude information is zero, corresponding to the RFID tag not being detected. As the RFID tag moves toward the center of the antenna 104a, the amplitude increases, reaching a maximum of about 0.75 at 306. Since the phase information detected by the main antenna 102 is in-phase with the phase information detected by the antenna 104a, this indicates that the RFID tag is inside both antennas, and is shown by the positive amplitude curve of the plot 300 between 304 and 308. As the RFID tag moves toward the right-side loop of the antenna 104a, the amplitude decreases down to zero at 308.

As the RFID tag continues past 308, the antenna 104a detects that the amplitude information increases (negatively) for a bit before returning to zero at 310. As before, the amplitude is shown as a negative value due to the phase information comparison between the main antenna 102 and the antenna 104a. Since the RFID tag is inside the main antenna 102 but outside the antenna 104a between 308 and 310, the comparison result is out-of-phase, and the amplitude of the plot 300 is shown as a negative between 308 and 310.

As an example, imagine that the antenna 104a detects an amplitude of 0.2. Using just the amplitude information, the RFID tag could be at the position corresponding to one of six points: 320, 322, 324, 326, 330 or 332. If the phase information indicates out-of-phase, the RFID tag could be at the position corresponding to one of the four points 320, 322, 324 or 326. If the phase information indicates in-phase, the RFID tag could be at the position corresponding to one of the two points 330 or 332. Next, FIG. 4 shows how adjacent antennas can be used to narrow these multiple positions down to a single position.

Figure 4:
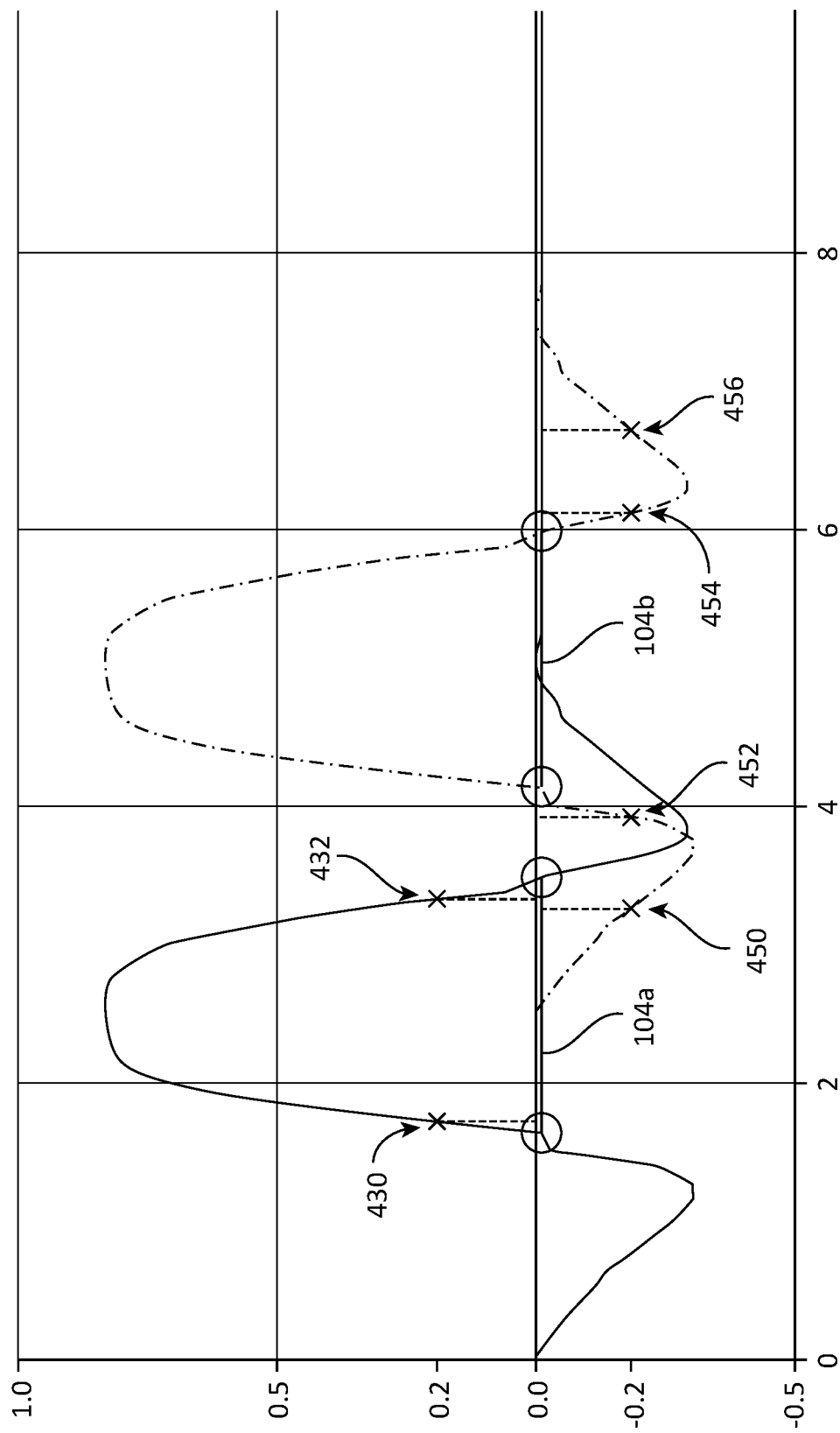
FIG. 4 is a graph showing plots 400 and 402 of amplitude and phase information detected by two of the antennas 104, or by two of the antennas 106 (see FIG. 1).

FIG. 4 is a graph showing plots 400 and 402 of amplitude and phase information detected by two of the antennas 104, or by two of the antennas 106 (see FIG. 1). For illustrative purposes, assume that the plot 400 corresponds to the signal received by the antenna 104a, similar to the plot 300 (see FIG. 3); the plot 402 corresponds to the signal received by the nearby antenna 104b. The antennas 104a and 104b may be referred to as adjacent antennas. The plots 400 and 402 are otherwise similar to the plot 300 (see FIG. 3).

Due to the distance between the antennas 104a and 104b, there is some overlap among the plots 400 and 402. This overlap provides the RFID system 100 (see FIG. 1) with the ability to correlate the amplitude and phase information detected by each antenna with the position of the RFID tag.

Returning to the example discussed above regarding FIG. 3, imagine that the antenna 104a detects an in-phase amplitude of 0.2, which indicates the RFID tag could be at the position corresponding to one of two points: 430 or 432. Imagine that the antenna 104b detects an out-of-phase amplitude of 0.2, which indicates that the RFID tag could be at the position corresponding to one of four points: 450, 452, 454 or 456. By correlating these measurements, the RFID system 100 determines that the position of the RFID tag is the one that corresponds to point 432 (antenna 104a) and point 450 (antenna 104b); on the gaming table, this position is slightly inside the right-hand side of the antenna 104a. (Note that FIG. 4 corresponds to a side view of the antenna 104a, so in the overhead view of FIG. 1, the position of the RFID tag corresponds to one on a line slightly inside the right-hand side of the antenna 104a.) Next, FIG. 5 shows how to extend this example to two dimensions.

Figure 5:
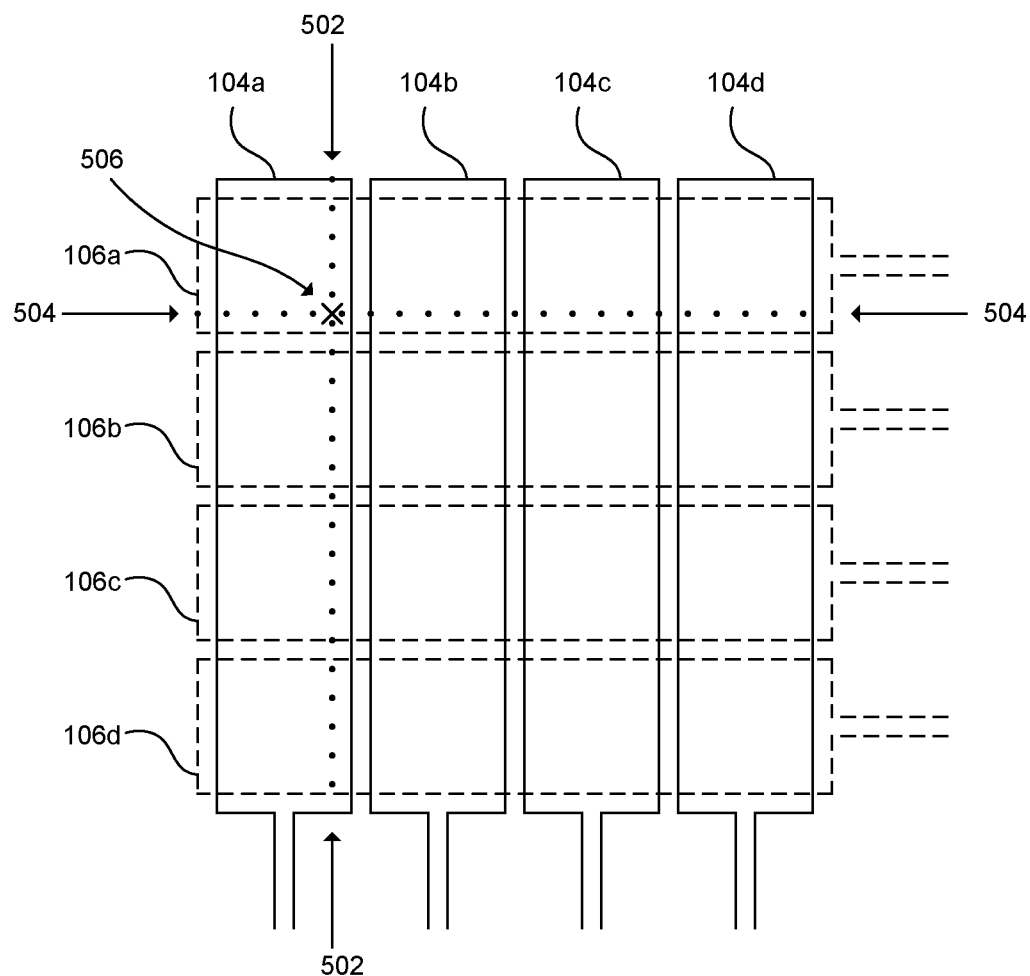
FIG. 5 is an overhead view of the antennas 104 and 106 of FIG. 1.

FIG. 5 is an overhead view of the antennas 104 and 106 of FIG. 1. Continuing the thought experiment discussed above regarding FIG. 4, imagine that the RFID system 100 uses the antennas 104 to determine that the RFID tag is on a position corresponding to the line 502, due to the amplitude and phase information detected by the antennas 104a and 104b. Further imagine that the RFID system 100 uses the antennas 106 to determine that the RFID tag is on a position corresponding to the line 504, due to the amplitude and phase information detected by the antennas 106a and 106b (in a manner similar to that discussed above regarding the antennas 104a and 104b). The RFID system 100 is then able to determine the position of the RFID tag as the intersection of the lines 502 and 504, position 506. In this manner, the RFID system 100 is able to determine the positions of one or more RFID tags in the vicinity of the antenna array.

Figure 6:
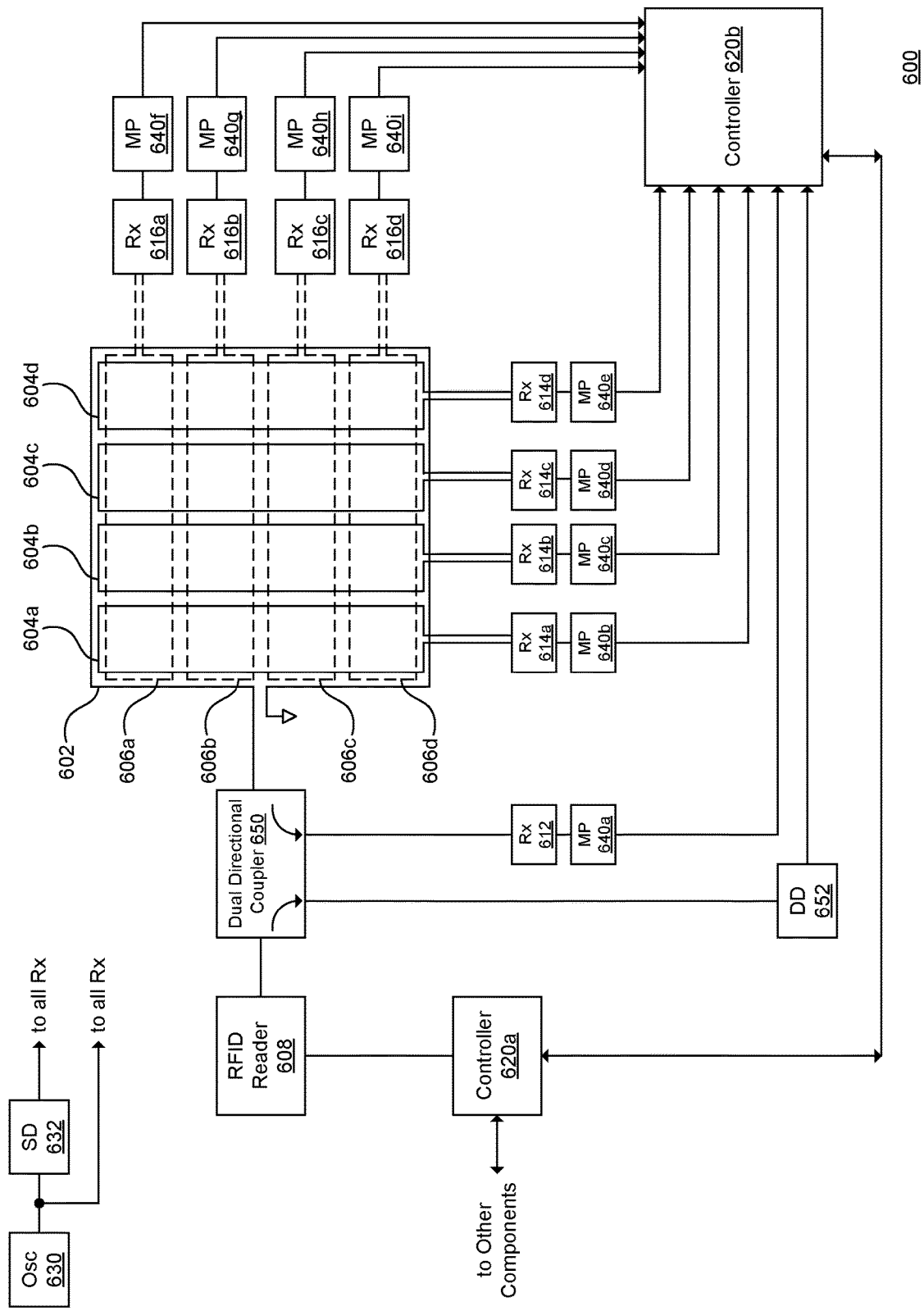
FIG. 6 is a block diagram of an RFID system 600. The RFID system 600 shows a specific implementation of the RFID system 100 (see FIG. 1).

FIG. 6 is a block diagram of an RFID system 600. The RFID system 600 shows a specific implementation of the RFID system 100 (see FIG. 1). The RFID system 600 includes a main antenna 602, a first set of antennas 604a-604d (collectively antennas 604), a second set of antennas 606a-606d (collectively antennas 606), an RFID reader 608, a main RFID receiver 612, a first set of RFID receivers 614a-614d (collectively RFID receivers 614), a second set of RFID receivers 616a-616d (collectively RFID receivers 616), and controllers 620a and 620b (collectively controllers 620). These components are similar to the components discussed above regarding the RFID system 100 (see FIG. 1). The RFID system 600 also includes an oscillator 630, a signal divider 632, microprocessors 640a-640i (collectively microprocessors 640), a dual-directional coupler 650, and a diode detector 652.

The RFID reader 608 includes an RFID transmitter and a RFID receiver. The RFID transmitter is similar to the main RFID transmitter 108 (see FIG. 1). The RFID receiver enables the RFID reader 608 to read the identifiers of the RFID tags, if so desired. The RFID reader 608 may be a "stock" or "off the shelf" RFID reader. The RFID reader 608 generates a radio frequency signal that is provided to the dual directional coupler 650. The RFID reader 608 may also read the identifiers of the responses from any RFID tags in the area.

Figure 7:
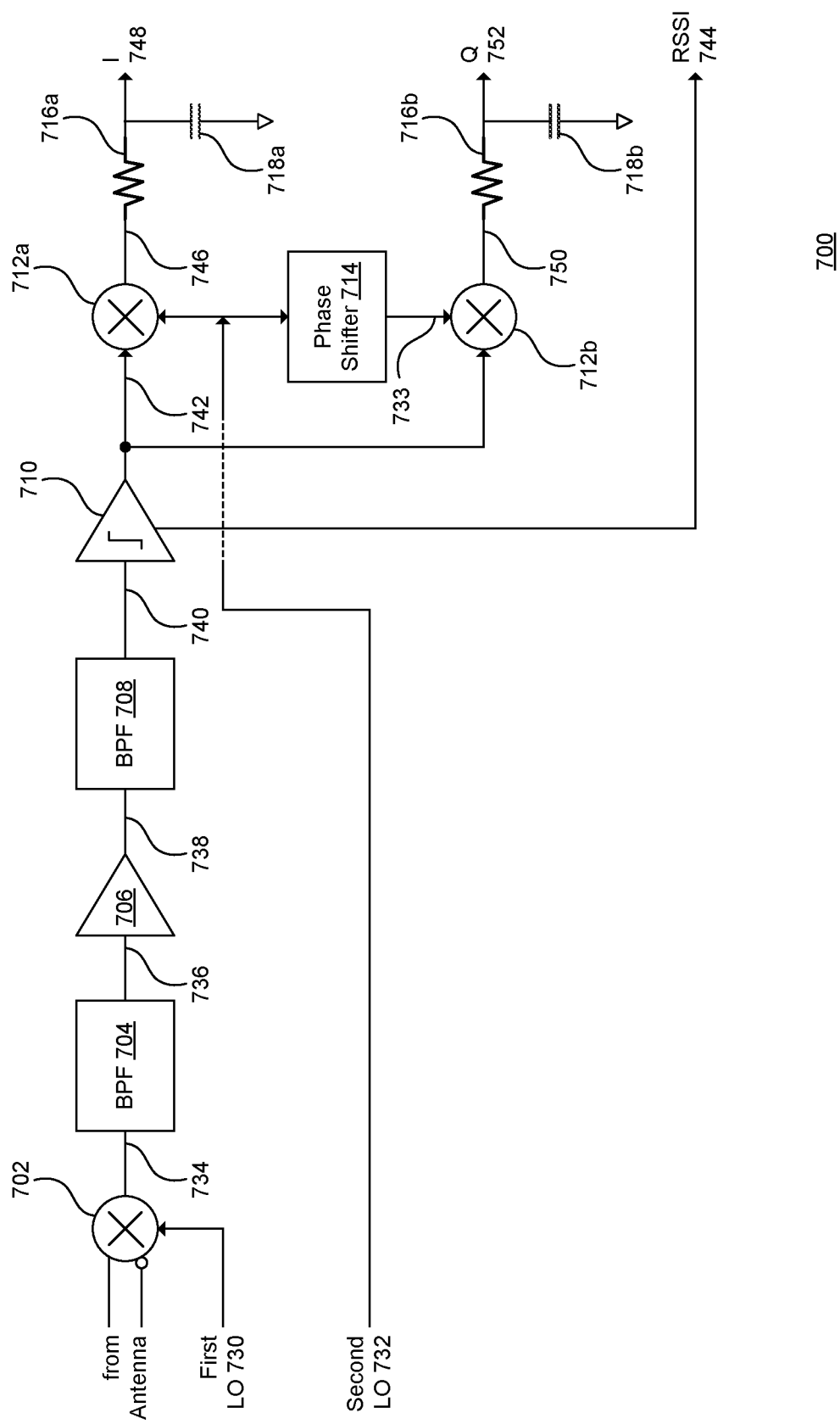
FIG. 7 is a block diagram of a receiver 700.

The oscillator 630 generates a first local oscillator signal at a desired frequency. For the RFID system 600, the RFID tags are designed to operate at a frequency of 13.56 MHz. This frequency may be adjusted as desired in other embodiments. The oscillator 630 provides this first local oscillator signal to the receivers 612, 614 and 616 (as also shown in FIG. 7), and to the signal divider 632.

The signal divider 632 divides the first local oscillator signal from the oscillator 630 in order to generate a second local oscillator signal. For the RFID system 600, the RFID tags are designed to operate with a modulation frequency of 424 kHz. Thus, the signal divider 632 divides the 13.56 MHz signal by 32 to get 424 kHz. The modulation frequency may be adjusted as desired in other embodiments. The signal divider 632 provides this second local oscillator signal to the receivers 612, 614 and 616 (as also shown in FIG. 7).

The microprocessors 640 process the amplitude and phase information from the receivers 612, 614 and 616, and provide the amplitude and phase information from each of the receivers to the controller 620b. The microprocessors 640 receive an enable signal from the controller 620b to selectively enable them.

The dual-directional coupler 650 generally couples the RFID reader 608, the main antenna 602, the main RFID receiver 612, and the controller 620b (via the diode detector 652). The dual-directional coupler 650 couples the radio frequency energy transmitted by the RFID reader 608 to the main antenna 602, and directs a portion of the transmitted radio frequency energy to the controller 620b (via the diode detector 652). The dual-directional coupler 650 couples the radio frequency energy received by the main antenna 602 to the RFID reader 608, and directs a portion of the received radio frequency energy to the main RFID receiver 612.

The diode detector 652 generally functions as an envelope detector. The controller 620b uses the output of the diode detector to determine the time at which a tag may be responding. This allows the controller 620b to have the receivers 614 and 616 start sampling the antenna signals.

The controllers 620 generally control the operation of the RFID system 600, as discussed above regarding the controller 120 (see FIG. 1) and the method 200 (see FIG. 2). The controller 620a generally controls the RFID reader 608, and processes the data collected by the controller 620b in order to determine the positions of the RFID tags. The controller 620a may connect to the RFID reader 608 via an Ethernet connection, and may connect to the controller 620b via a universal serial bus (USB) connection. The controller 620a may be implemented with a computer (e.g., a personal computer) that is connected via a network to other devices. The controller 620b generally collects the amplitude and phase information received by the receivers 612, 614 and 616. The controller 620b may be implemented with a microprocessor or a programmable logic device.

The RFID system 600 generally operates as follows. The controller 620a instructs the RFID reader 608 to transmit an inventory command. The RFID reader 608 turns on its radio frequency output and sends a signal to the RFID tags (e.g., by amplitude modulating the carrier signal of its radio frequency output). The dual-directional coupler 650 directs a portion of this signal to the diode detector 652. The controller 620b monitors the output of the diode detector 652 in order to determine when to have the receivers start sampling for an RFID tag which may be responding to the RFID reader 608. At this time, the controller 620b instructs the microprocessors 640, using the enable signal, to begin sampling the RSSI information. When the controller 620b determines the end of the RFID tag response, the controller 620b uses the enable signal to instruct the microprocessors 640 to sample the I and Q levels from the receivers 612, 614 and 616, and to process the RSSI information to determine the data returned by the RFID tag. (This data is generally the serial number of the RFID tag, in response to the inventory command.) The I and Q information determine the phase of the modulated second local oscillator signal of the response from the RFID tag (e.g., at 424 kHz). Note that the phase of the modulated second local oscillator signal is indeterminate when using a single one of the receivers 614 or 616. However, by comparing the phase detected by one of the receivers 614 or 616 and the phase detected by the receiver 612, the controller 620b is able to determine whether or not the RFID tag is inside of, or outside of, a given antenna loop.

The oscillator 630 provides the first local oscillator signal (e.g., 13.56 MHz) to the receivers 612, 614 and 616, and to the signal divider 632. The signal divider 632 generates the second local oscillator signal (e.g., 424 kHz) and provides this second local oscillator signal to the receivers 612, 614 and 616. The RFID tags respond to the inventory command by load modulating a subcarrier signal onto the carrier signal transmitted by the RFID reader 608. The receivers 612, 614 and 616 determine the modulated subcarrier signal from the RFID tags by first mixing the antenna signal first with the first local oscillator signal. After filtering and amplifying, the signal is mixed with the second local oscillator signal to demodulate the modulated subcarrier signal to baseband to determine the I and Q components.

The controller 620b analyzes the data from the receivers 614, and the data from the receiver 612, to determine the location of the RFID tag on the x axis. Similarly, the controller 620b analyzes the data from the receivers 616, and the data from the receiver 612, to determine the location of the RFID tag on they axis. The controller 620b may use the RSSI from the receiver 612 to normalize the signals received from the other receivers 614 and 616 so that higher fidelity position information can be attained.

Although four sets of antennas 604 and antennas 606 (and their associated receivers 614 and 616) are shown, these numbers may be adjusted as desired. Similarly, the shapes of the antennas 604 and 606 may be adjusted.

FIG. 7 is a block diagram of a receiver 700. The receiver 700 may be a specific implementation for one or more of the receivers 612, 614 or 616 (see FIG. 6). The receiver 700 includes a mixer 702, a band-pass filter 704, an amplifier 706, a band-pass filter 708, a limiting amplifier 710, mixers 712a and 712b, a phase shifter 714, resistors 716a and 716b, and capacitors 718a and 718b.

The receiver 700 is connected to one of the antennas (e.g., one of the antennas 602, 604 or 606 of FIG. 6). The receiver 700 receives a first local oscillator (LO) signal 730 (e.g., at 13.56 MHz) from the oscillator 630 (see FIG. 6), and receives a second local oscillator signal 732 (e.g., at 424 kHz) from the signal divider 632 (see FIG. 6).

The mixer 702 mixes the radio frequency signal received by the antenna (e.g., one of the antennas 602, 604 or 606 of FIG. 6) with the first local oscillator signal 730, in order to generate a modulated subcarrier signal 734 (e.g., at 424 kHz). (The subcarrier signal 734 is a modulated subcarrier signal due to the radio frequency energy from the RFID reader (e.g., 608 in FIG. 6) being modulated by the RFID tag in the area.)

The band-pass filter 704 performs band-pass filtering on the modulated subcarrier signal 734 to reduce the noise, and generates a modulated subcarrier signal 736. The band-pass filter 704 has a center frequency around the expected frequency of the subcarrier signal (e.g., 424 kHz).

The amplifier 706 amplifies the modulated subcarrier signal 736, and generates a modulated subcarrier signal 738. The band-pass filter 708 performs band-pass filtering on the modulated subcarrier signal 738 to further reduce the noise, and generates a modulated subcarrier signal 740. The band-pass filter 708 has a center frequency around the expected frequency of the subcarrier signal (e.g., 424 kHz).

The limiting amplifier 710 drives the modulated subcarrier signal 740 into limiting (e.g., by having a high gain) so that the I and Q phase signals are independent of signal amplitude, resulting in a modulated subcarrier signal 742. The limiting amplifier 710 also outputs a RSSI signal 744 that is proportional to the level of the modulated subcarrier signal 740 (e.g., in dB). The RSSI signal 744 is then provided to the controller 620*b* of FIG. 6, and corresponds to the RSSI or amplitude information discussed above.

The mixer 712*a* mixes the modulated subcarrier signal 742 with the second local oscillator signal 732 in order to extract a modulated signal 746. The modulated signal 746 corresponds to the modulation of the subcarrier signal (e.g., at 424 kHz) performed by the RFID tag in the area. The resistor 716*a* and the capacitor 718*a* form a low-pass filter that performs low-pass filtering on the modulated signal 746, resulting in an in-phase (I) signal 748. The in-phase signal 748 is then provided to the controller 620*b* of FIG. 6, and corresponds to the in-phase (I) signal component discussed above.

The phase shifter 714 performs phase-shifting by 90 degrees on the second local oscillator signal 732 to generates a phase-shifted second local oscillator signal 733.

The mixer 712*b* mixes the modulated subcarrier signal 742 with the phase-shifted second local oscillator signal 733 in order to create a demodulated signal 750. The demodulated signal 750 corresponds to an unfiltered quadrature (Q) signal. The resistor 716*b* and the capacitor 718*b* form a low-pass filter that performs low-pass filtering on the demodulated signal 750, resulting in a quadrature (Q) signal 752. The quadrature signal 752 is then provided to the controller 620*b* of FIG. 6, and corresponds to the quadrature (Q) signal component discussed above.

As discussed above, the controllers 620 (see FIG. 6) are able to determine whether a given RFID tags is inside of, or outside of, one or more of the antennas 604 and 606 by comparing the I and Q components received by that antenna with the I and Q components received by the main antenna 602.

According to another embodiment, instead of the receiver 700, the receiver may be implemented as a software defined radio. In general, a software defined radio samples the signal from the antenna with a high speed analog to digital converter, then processes the signals digitally, in order to detect the amplitude and phase.

Figure 8:
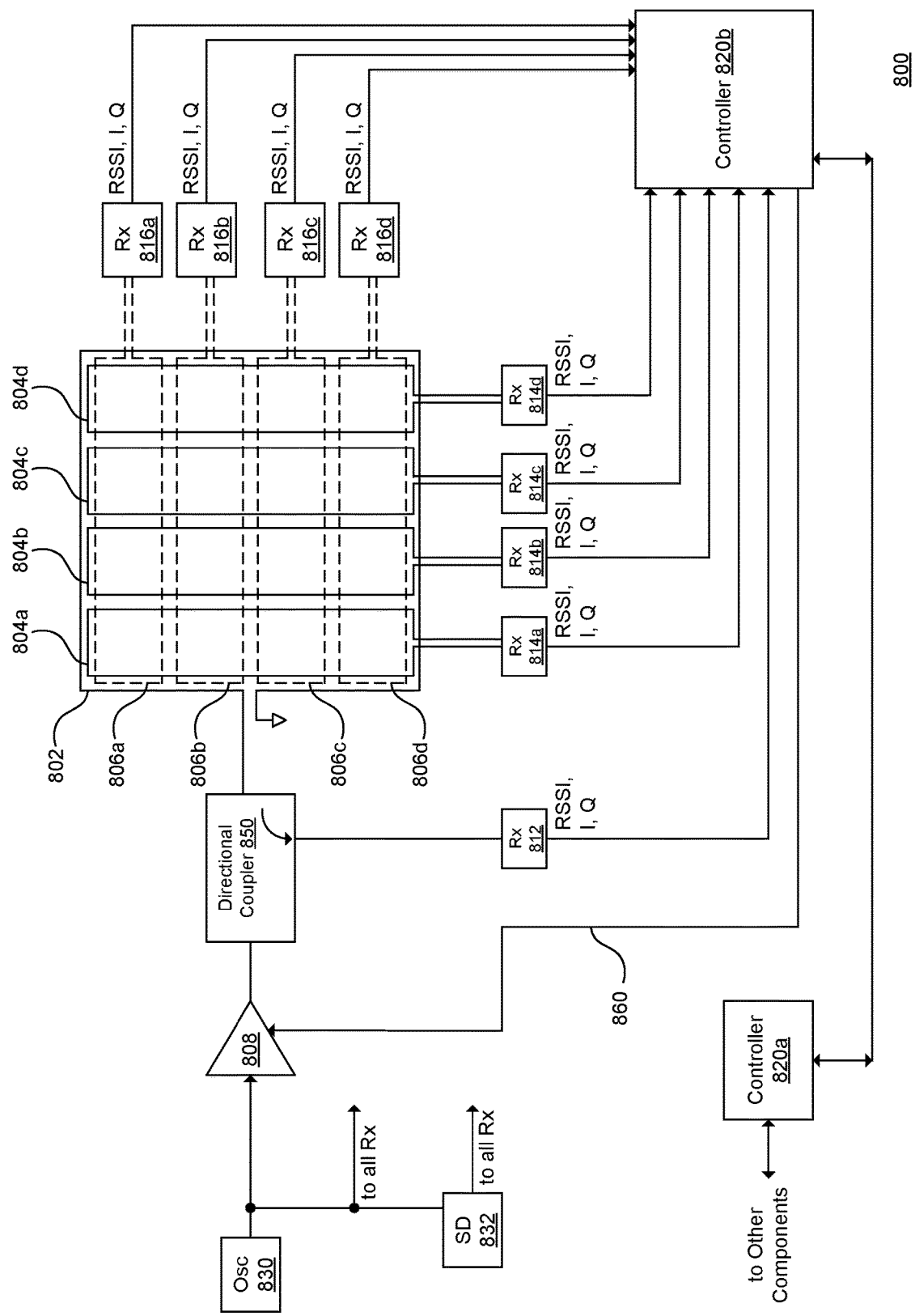
FIG. 8 is a block diagram of an RFID system 800.

FIG. 8 is a block diagram of an RFID system 800. The RFID system 800 shows a specific implementation of the RFID system 100 (see FIG. 1). The RFID system 800 includes a main antenna 802, a first set of antennas 804*a*-804*d* (collectively antennas 804), a second set of antennas 806*a*-806*d* (collectively antennas 806), an RF transmitter 808, a main RFID receiver 812, a first set of RFID receivers 814*a*-814*d* (collectively RFID receivers 814), a second set of RFID receivers 816*a*-816*d* (collectively RFID receivers 816), controllers 820*a* and 820*b* (collectively controllers 820), an oscillator 830, and a signal divider 832. These components are similar to the components discussed above regarding the RFID system 100 (see FIG. 1) or the RFID system 600 (see FIG. 6). The RFID system 800 also includes a directional coupler 850.

The RFID system 800 is similar to the RFID system 600 (see FIG. 6), with the main differences being replacing the RFID reader 608 (see FIG. 6) with the RF transmitter 808, replacing the controller 620*b* with the controller 820*b*, and replacing the dual-directional coupler 650 with the directional coupler 850. In brief, the RFID system 600 (see FIG. 6) is directed to using a "stock" or "off the shelf" RFID reader (the RFID reader 608), and the RFID system 800 is directed to using a controllable RF transmitter (the RF transmitter 808).

The oscillator 830 generates a first local oscillator signal at a desired frequency. For the RFID system 800, the RFID tags are designed to operate at a frequency of 13.56 MHz. This frequency may be adjusted as desired in other embodiments. The oscillator 830 provides the first local oscillator signal to the receivers 812, 814 and 816. The receivers 812, 814 and 816 may be implemented in a manner similar to the receiver 700 (see FIG. 7), in which case this signal corresponds to the first local oscillator signal 730.

The signal divider 832 divides the first local oscillator signal from the oscillator 830 in order to generate a second local oscillator signal. For the RFID system 800, the RFID tags are designed to operate with a modulation frequency of 424 kHz. Thus, the signal divider 832 divides the 13.56 MHz signal by 32 to get 424 kHz. The modulation frequency may be adjusted as desired in other embodiments. The signal divider 832 provides this second local oscillator signal to the receivers 812, 814 and 816 (as also shown in FIG. 7), in which case this signal corresponds to the second local oscillator signal 732.

The directional coupler 850 generally couples the RF transmitter 808, the main antenna 802 and the main RFID receiver 812. The directional coupler 850 couples the radio frequency energy transmitted by the RF transmitter 808 to the main antenna 802. The directional coupler 850 couples the radio frequency energy received by the main antenna 802 to the RF transmitter 808, and directs the received radio frequency energy to the main RFID receiver 812.

The controllers 820 generally control the operation of the RFID system 800, as discussed above regarding the controller 120 (see FIG. 1) and the method 200 (see FIG. 2). The controller 820*a* generally acts as an interface to the other components. The controller 820*a* may connect to the controller 820*b* via an Ethernet connection. The controller 820*a* may be implemented with a computer (e.g., a personal computer) that is connected via a network to other devices. The controller 820*b* generally controls the RF transmitter 808, collects the amplitude and phase information received by the receivers 812, 814 and 816, and processes the amplitude and phase information to determine the positions of the RFID tags. The controller 820*b* may be implemented with a microprocessor or a programmable logic device.

The RFID system 800 generally operates as follows. The controller 820*b* controls the RF transmitter 808 using a modulation signal 860. The RF transmitter 808 applies the modulation signal 860 to its RF carrier signal to command the tags (e.g., to transmit an inventory command using amplitude modulation of a subcarrier signal on the carrier signal of its radio frequency output). The directional coupler 850 directs this signal to the main antenna 802. The controller 820*b* receives the amplitude and phase information (RSSI, I and Q) from the receivers 812, 814 and 816. (This data is generally the serial number of the RFID tag, in response to the inventory command.) The I and Q information determine the phase of the modulated subcarrier of the response from the RFID tag (e.g., at 424 kHz). Note that the phase of the modulated subcarrier is indeterminate when using a single one of the receivers 814 or 816. However, by comparing the phase detected by one of the receivers 814 or 816 and the phase detected by the receiver 812, the controller 820*b* is able to determine whether or not the RFID tag is inside of, or outside of, a given antenna loop.

The oscillator 830 provides the first local oscillator signal (e.g., 13.56 MHz) to the receivers 812, 814 and 816, and to the signal divider 832. The signal divider 832 generates the second local oscillator signal (e.g., 424 kHz) and provides this signal to the receivers 812, 814 and 816. The RFID tags respond to the inventory command by load modulating a subcarrier signal onto the carrier signal transmitted by the RF transmitter 808. The receivers 812, 814 and 816 determine the modulated subcarrier signal from the RFID tags by mixing the detected subcarrier signal with the first local oscillator signal from the oscillator 830. The receivers 812, 814 and 816 demodulate the modulated subcarrier signal to baseband to determine the I and Q components.

The controller 820*b* analyzes the data from the receivers 814, and the data from the receiver 812, to determine the location of the RFID tag on the x axis. Similarly, the controller 820*b* analyzes the data from the receivers 816, and the data from the receiver 812, to determine the location of the RFID tag on they axis. The controller 820*b* may use the RSSI from the receiver 812 to normalize the signals received from the other receivers 814 and 816 so that higher fidelity position information can be attained.

Although four sets of antennas 804 and antennas 806 (and their associated receivers 814 and 816) are shown, these numbers may be adjusted as desired. Similarly, the shapes of the antennas 804 and 806 may be adjusted.

Figure 9:
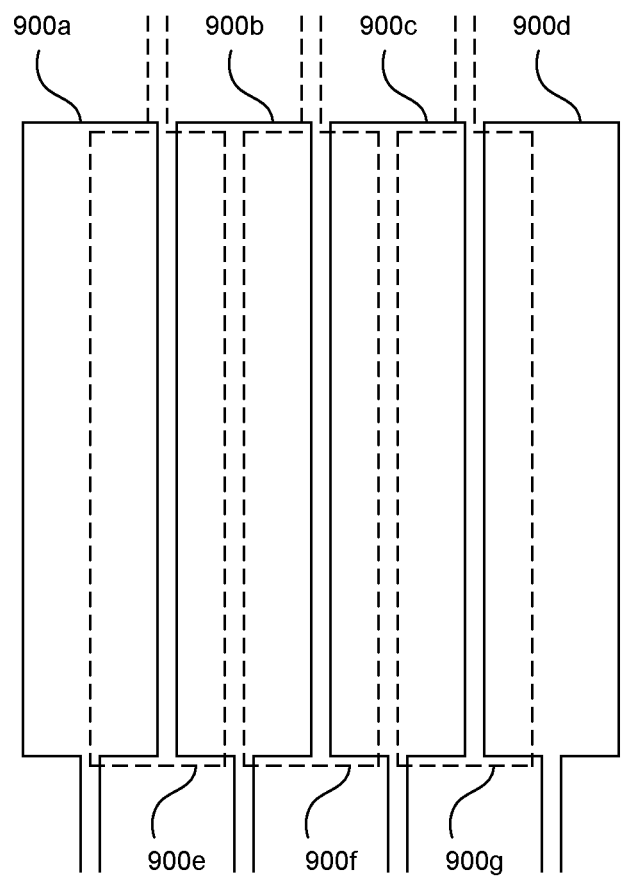
FIG. 9 is an overhead view of a set of overlapping antennas 900 in one direction.

FIG. 9 is an overhead view of a set of overlapping antennas 900 in one direction. The overlapping of the antennas 900 increases the number of antennas that may receive the response from a given RFID tag, which increases the amount of data available to the RFID system and possibly increases the accuracy of the position determination of the RFID tag. The antennas 900 include antennas 900*a*, 900*b*, 900*c*, 900*d*, 900*e*, 900*f* and 900*g*. The antennas 900 are associated with RFID receivers (not shown); these RFID receivers may be similar to the RFID receivers 114, 116 (see FIG. 1), 614, 616 (see FIG. 6), 700 (see FIG. 7), 814, or 816 (see FIG. 8). Note that the antennas 900*e*, 900*f* and 900*g* are shown slightly offset, for illustrative clarity.

The antennas 900 may be used in place of one of the sets of antennas in a particular direction. For example, the antennas 900 may be used in place of the antennas 104 (see FIG. 1) for the x direction, or the antennas 106 (see FIG. 1) for the y direction. The antennas 900 may be used in place of the antennas 604 (see FIG. 6) for the x direction, or the antennas 606 (see FIG. 6) for the y direction. The antennas 900 may be used in place of the antennas 804 (see FIG. 8) for the x direction, or the antennas 806 (see FIG. 8) for the y direction.

The antennas 900 may be printed as dual layers on a printed circuit board. The number, and shape, of the antennas 900 may be adjusted as desired.

Figure 10:
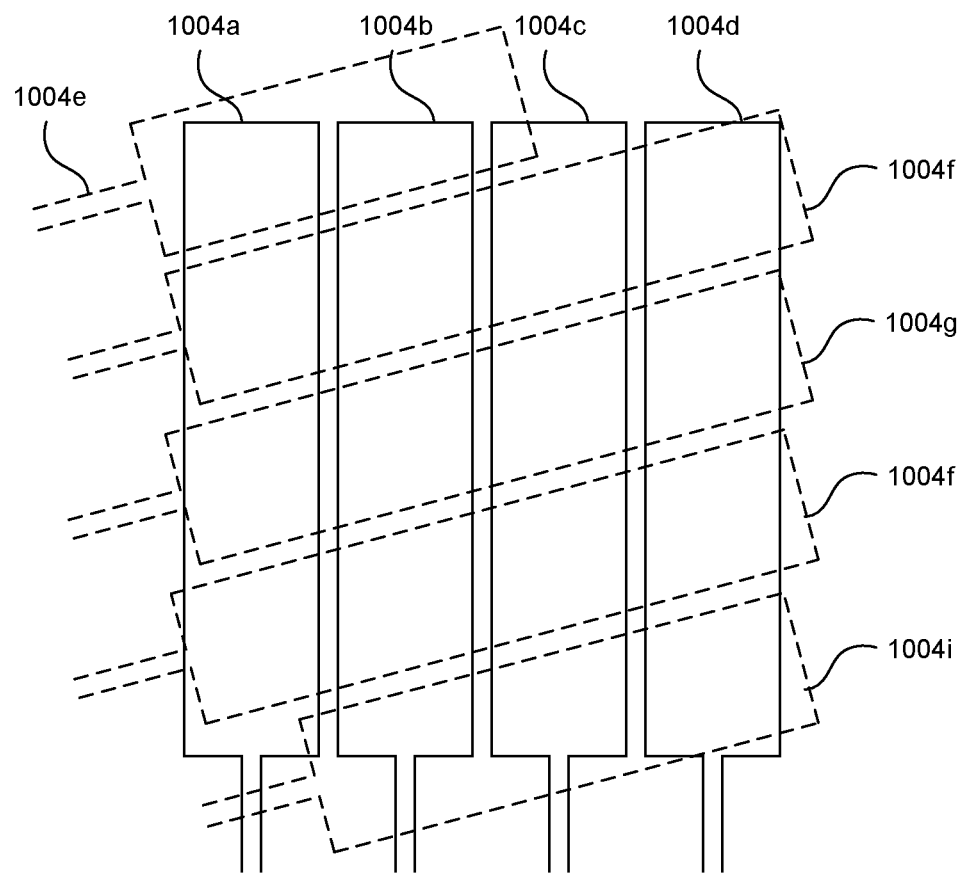
FIG. 10 is an overhead view of an antenna array 1000.

FIG. 10 is an overhead view of an antenna array 1000. The antenna array 1000 includes a first set of antennas 1004*a*, 1004*b*, 1004*c* and 1004*d* (collectively antennas 1004), and a second set of antennas 1006*a*, 1006*b*, 1006*c*, 1006*d*, 1006*e*, 1006*f*, 1006*g*, 1006*h*, 1006*i* (collectively antennas 1006). As compared to other of the antenna arrays (e.g., the antennas 104 and 106 of FIG. 1), the antennas 1004 and 1006 do not intersect at right angles. The antenna array 1000 may be used in place of the antennas 104 and 106 (see FIG. 1), 604 and 606 (see FIG. 6), or 804 and 806 (see FIG. 8). The antennas 1004, the antennas 1006, or both, may be overlapping in a manner similar to that of the antennas 900 (see FIG. 9).

The number, and shape, of the antennas 1004 and 1006 may be adjusted as desired.

Figure 11:
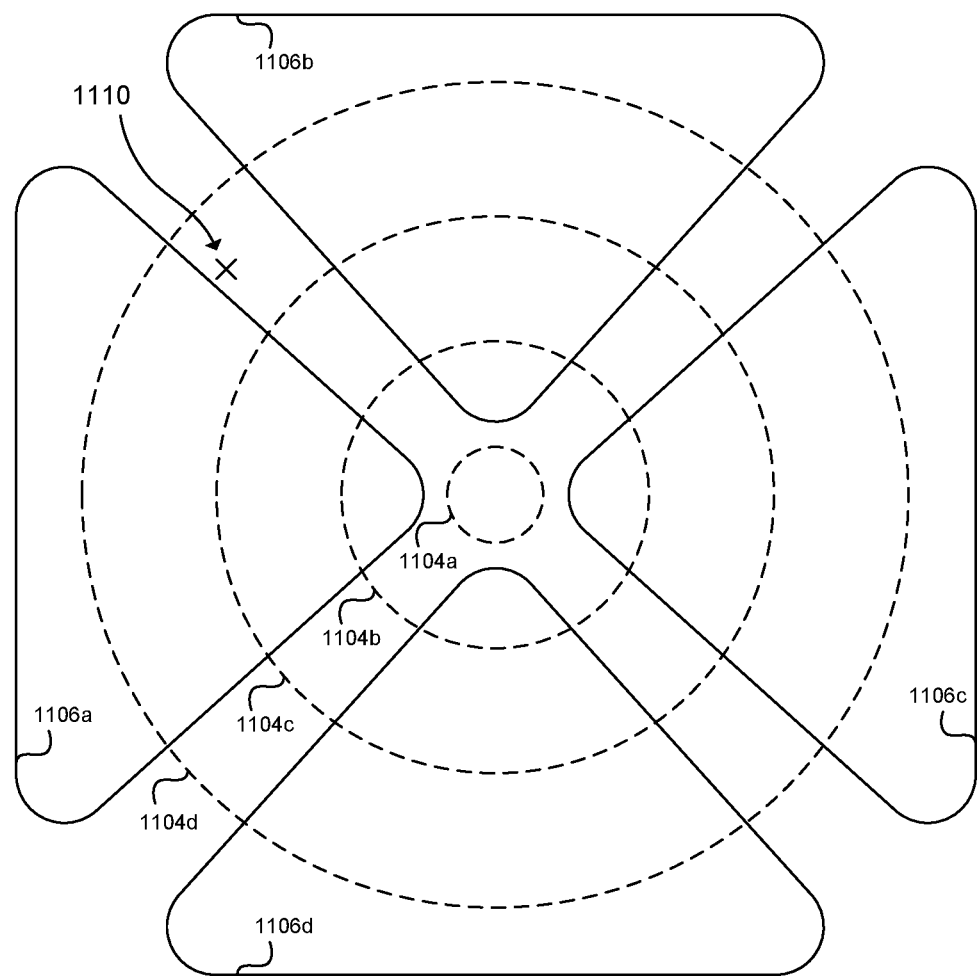
FIG. 11 is an overhead view of a polar antenna array 1100.

FIG. 11 is an overhead view of a polar antenna array 1100. The polar antenna array 1100 includes overlapping circular antennas 1104*a*, 1104*b*, 1104*c* and 1104*d* (collectively circular antennas 1104), and radial antennas 1106*a*, 1106*b*, 1106*c* and 1106*d* (collectively radial antennas 1106). The antennas 1104 are shown with dotted lines. As compared to other of the antenna arrays (e.g., the antennas 104 and 106 of FIG. 1), the antenna array 1100 does not generate x and y position information, but instead generates polar position information (e.g., magnitude and direction). The circular antennas 1104 are used to determine the distance from the center point 1110, and the radial antennas 1106 are used to determine the angle. The polar antenna array 1100 may be used in place of the antennas 104 and 106 (see FIG. 1), 604 and 606 (see FIG. 6), 804 and 806 (see FIG. 8), or the antenna array 1000 (see FIG. 10).

As an example, say that the system detects an RFID tag inside of the circular antenna 1104*d* and outside of the circular antenna 1104*c*. If the system further detects that RFID tag outside of the radial antenna 1106*a*, the system determines that the position of the RFID tag is in the vicinity of the point 1110. The accuracy of the position determination can be determined according to the values of the signals detected, as discussed above regarding FIGS. 3-4 (or as further detailed below in the section Determining the Positions).

As an option, the circular antennas 1104 need not be overlapping. Similarly, the radial antennas 1106 need not be overlapping. As another option, the circular antennas 1104 can be annular or ring-shaped, and overlapping or non-overlapping or partially overlapping.

FIG. 12A is an overhead view of a Baccarat table 1200, and FIG. 12B is an overhead view of a portion of the Baccarat table 1200 showing a corresponding portion of an antenna array 1202. In FIG. 12A, the entire antenna array 1202 is present, but not shown. In FIG. 12B, the antenna array 1202 includes a first set of antennas 1204*a*, 1204*b*, 1204*c*, 1204*d*, 1204*e*, 1204*f*, 1204*g* and 1204*h* (collectively antennas 1204) and a second set of antennas 1206*a*, 1206*b*, 1206*c* and 1206*d* (collectively antennas 1206). The Baccarat table 1200 also includes one or more main antennas (not shown), similar to the main antenna 102 (see FIG. 1). For one main antenna, it may surround the entire playing area of the Baccarat table 1200. For two main antennas, each may cover a portion of the Baccarat table 1200. For example, one may surround the betting positions on the left-hand portion of the Baccarat table 1200 (positions 7-12), and the other may surround the betting positions on the right-hand portion of the Baccarat table 1200 (positions 1-6). Alternatively, the main antenna can define a bounded area for some (or all) of a single type of bet (e.g. player or banker). Such an array can be used to track individual bets within the bounded area.

The antennas 1204 and 1206 (and the main antenna) are connected to RFID readers (not shown), in a manner similar to the RFID receivers 114 or 116 (see FIG. 1). The antennas 1204 are wider at one end than at the other end. The antennas 1206 are slightly bent or curved, in order to conform to the Baccarat table 1200.

As an option, the antennas 1204, the antennas 1206, or both may be overlapping in a manner similar to that of the antennas 900 (see FIG. 9).

FIG. 13 is an overhead view of a roulette table 1300 having an antenna array 1302. The antenna array 1302 includes a first set of antennas 1304*a*, 1304*b*, 1304*c*, 1304*d* and 1304*e* (collectively antennas 1304) and a second set of antennas 1306*a*, 1306*b*, 1306*c*, 1306*d*, 1306*e*, 1306*f*, 1306*g*, 1306*h*, 1306*i*, 1306*j*, 1306*k*, 1306*l*, 1306*m* and 1306*n* (collectively antennas 1306). The roulette table 1300 also includes a main antenna (not shown), similar to the main antenna 102 (see FIG. 1), that surrounds the playing area. The antennas 1304 and 1306 (and the main antenna) are connected to RFID readers (not shown), in a manner similar to the RFID receivers 114 or 116 (see FIG. 1).

As an option, the antennas 1304, the antennas 1306, or both may be overlapping in a manner similar to that of the antennas 900 (see FIG. 9).

Finally, regarding the sizing of the antennas discussed herein, generally the width of each antenna should be less than the diameter of the RFID tags (or within around +/−0.5 inches of the diameter of the RFID tags), and the spacing between each antenna should also be less than the diameter of the RFID tags.

Reading the RFID Tags

As discussed above, the RFID reader (e.g., the RFID transmitter 108 of FIG. 1) sends an inventory command (e.g., 202 in FIG. 2) that the RFID tags respond to (e.g., 204 in FIG. 2). The RFID tags include anti-collision features to mitigate interference resulting when two or more RFID tags respond at the same time. One anti-collision feature is a pseudo-random selection of the slot in which they respond. Statistically, the different pseudo-random slots among a plurality of RFID tags helps prevent them from all responding at the same time.

Another anti-collision feature is the 5 bit CRC that is added to the inventory command which is sent from the tag to the reader along with the 16 bit CRC of the serial number of the tag. If the CRCs are not correct then there is likely a collision. When all the RFID tags have been read, the RFID reader stops radiating energy, which causes the RFID tags to clear their flags; with the cleared flags, the RFID tags are free to respond when the RFID reader begins radiating energy again when sending the next inventory command.

The RFID reader may implement a slotted Aloha system or a binary tree search. In the slotted Aloha system, the RFID reader broadcasts an initialization command and a parameter that the tags individually use to pseudo-randomly delay their responses. In the binary tree search, the RFID reader sends an initialization symbol and then transmits one bit of identification data at a time; only RFID tags with matching bits respond, and eventually only one RFID tag matches the complete identification string.

Each RFID tag may include 96 bits of identification information, which allows for $2^{96}$ total RFID tags to be individually identified by the system. The RFID tags may send their responses using Manchester encoding of their modulation on the carrier signal from the RFID reader.

As a result of the anti-collision features, the system can generally operate as if only one RFID tag is responding at a given time. This allows all of the receivers (e.g., the receivers 112, 114 and 116 of FIG. 1) that receive a response at a given time to associate together the respective responses received by each receiver. For clarity of illustration, the remainder of this document assumes that only one RFID tag is responding at a given time.

Determining the Positions

As discussed above, at least three receivers (e.g., the receiver 112, at least one of the receivers 114, and at least one of the receivers 116 of FIG. 1) of the RFID system (e.g., the RFID system 100) receive the response from a given RFID tag. For a given antenna in the x direction (e.g., the antenna 104*b*), the RFID system can determine that the given RFID tag is inside of, or outside of, the given antenna by comparing the signal phases between the given antenna in the x direction and the main antenna (e.g., the main antenna 102). Similarly, for a given antenna in the y direction (e.g., the antenna 106*b*), the RFID system can determine that the given RFID tag is inside of, or outside of, the given antenna by comparing the signal phases between the given antenna in the y direction and the main antenna. When the RFID system determines that the given RFID tag is inside of both the x direction antenna and the y direction antenna, the RFID system determines the position of the given RFID tag on the gaming table as being at the position where those two antennas intersect. In a simple case, the RFID system assumes the position is at the midpoint of the intersection.

When the RFID system determines that the given RFID tag is outside of either the x direction antenna or the y direction antenna, the RFID system needs to determine which direction outside. As an example in the x direction, if the given RFID tag is detected outside of the antenna 104*b*, the given RFID tag may be to the left of, or the right of, the antenna 104*b*. At this point, the RFID system looks at the responses received by the antennas adjacent to the antenna 104*b* (e.g., the antennas 104*a* and 104*c*). If the antenna 104*a* received the response and the antenna 104*c* did not, then the RFID system determines the position of the given RFID tag as to the left of the antenna 104*b*. Similarly, if the antenna 104*c* received the response and the antenna 104*a* did not, then the RFID system determines the position of the given RFID tag as to the right of the antenna 104*b*. In a simple case, the RFID system assumes the position is at the midpoint between the two antennas (104*b* and 104*a*, or 104*b* and 104*b*). In the y direction, a similar result occurs.

Interpolation

Instead of assuming the position at the midpoint, as discussed above, the RFID system (e.g., the RFID system 100 of FIG. 1) may interpolate the position based on the amplitude of the received signal. For example, the RFID system may store the plot 300 of FIG. 3 as a lookup table (e.g., in the controller 120). TABLE 1 is an example lookup table with 7 entries, corresponding to 7 segments of the plot 300 (where segment 1 is from point 302 down to the maximum negative value of the plot 300; segment 2 is from that point up to point 304; segment 3 is from point 304 up to near the maximum positive value of the plot 300; segment 4 is the portion around the maximum positive value; segment 5 is from near the maximum value down to point 308; segment 6 is from point 308 down to the maximum negative value of the plot 300; and segment 7 is from the maximum negative value up to point 310):

TABLE 1

| Segment | Amplitude | Position |
| --- | --- | --- |
| 1 | From 0 to −0.25 | 0.5 (approx. point 320) |
| 2 | From −0.25 to 0 | 1.4 (approx. point 322) |
| 3 | From 0 to 0.7 | 1.9 |
| 4 | Above 0.7 | 2.5 |
| 5 | From 0.7 to 0 | 3.2 |
| 6 | From 0 to −0.25 | 3.75 (approx. point 324) |
| 7 | From −0.25 to 0 | 4.2 (approx. point 326) |

(Since the plot 300 is symmetric, the data in TABLE 1 may be reduced to 4 entries, as offsets around a center point.) As discussed above, there may be multiple points for a given amplitude detected by a single antenna, so the RFID system uses adjacent antennas in order to eliminate the unlikely points.

The position data in TABLE 1 corresponds to the midpoint of each segment of the plot 300. Instead of using the midpoint when the amplitude falls anywhere within the appropriate range, the RFID system can interpolate using the exact amplitude. For example, if the amplitude is at −0.125 and (using adjacent antennas) the position is determined to be within the first segment, instead of using 0.5 as the position, the RFID system interpolates the position as halfway to 0.5, which is 0.25. The RFID system may use linear interpolation.

The number of entries in the lookup table may be increased, or decreased, as desired. As more entries appear in the lookup table, the interpolation becomes more accurate to the actual position.

In general, the values in TABLE 1 are applicable to the uniform-width antennas, such as in FIG. 5. For other antennas, such as the radial antennas 1106 of FIG. 11, or the antennas of FIG. 12B, the values in the corresponding lookup tables may be determined empirically.

Integration with Game Rules

The RFID system (e.g., the RFID system 100 of FIG. 1) may use the determined RFID information (e.g., the detected RFID tag identifiers and positions) to control various events in the gaming environment. In general, these events are managed according to game rules, and different game rules apply in different gaming circumstances (referred to as game states). When the RFID system detects a violation of the game rules, the RFID system may generate an alert. The RFID system may use the RFID readers described herein to determine the detected RFID tag identifiers and positions (generally referred to as chip data), and may use an instrumented card shoe to determine the values of cards dealt (generally referred to as card data).

In general, the game states are tailored to a particular game. For example, Baccarat may have the following game states: pre-game, new game, bets locked, payout, and end of game. In the pre-game state, the RFID system is not monitoring RFID tag identifiers or locations. In the new game state, the RFID system may track RFID tag identifiers and locations (and may display and record the resulting data), but since the game rules allow chips to be freely moved around in this state, no illegal move alerts are generated. (An exception may be made for detecting an illegal chip, which may result an illegal chip alert.) In the bets locked state, chip movements are not allowed, so any RFID tag movements detected may result in an alert. In the payout state, the RFID system monitors that the correct payout amounts are made to the correct locations, and that the correct collections are made from the correct locations, by correlating the RFID tags placed at (or removed from) the various locations. In the end of game state, the RFID system logs the end of the current game, and returns to the new game state for the next game.

A particular game state may include one or more sub-states (that may also be referred to as game states). For example, in blackjack, the dealer is obligated to deal another card to the dealer's hand depending upon the point total of the dealer's hand (e.g., 17). So within the game state of "deal cards to dealer's hand", there is a sub-state of "deal another card" and a sub-state of "deal no more cards". Similar states and sub-states exist for each hand. Similarly, if the dealer is dealt an initial Blackjack, the RFID system may transition from the "deal" state to the "collection/payout" state. As another example, Baccarat has a variety of sub-states within the gameplay state that each play position transitions between, depending upon the cards dealt. For example, the transition from play to payout can be staggered for each player.

The RFID system is particularly helpful during the collection and payout states. For example, the RFID system determines that Location 1 is a winner, and Location 2 is a loser, based on the game results. The RFID system knows the identifiers of the RFID tags associated with the locations, and verifies that additional chips corresponding to a correct payout are made to Location 1, and that the chips associated with Location 2 are collected.

Further information regarding the game rules and game states can be found in U.S. Application Pub. No. 2015/0312517 and U.S. Application Pub. No. 2016/0217645, which are incorporated herein by reference.

Grouping

The RFID system (e.g., the RFID system 100 of FIG. 1) may associate RFID tags that have similar positions into a single group. (These similar positions refer to the x-y plane; e.g., two RFID tags stacked on top of each other will have similar x-y positions but different z positions.) For example, if the determined positions of two RFID tags are less than approximately 0.75× diameters, the RFID system may consider those two RFID tags to be associated in a group. For example, for RFID tags having a diameter of 1.5 inches, a group results when two RFID tags are within about 1.125 inches. Similar groups may be formed from adjacent stacks of RFID tags. The controller may then consider that group of RFID tags as a single unit. For example, instead of interpreting a first RFID tag and a nearby second RFID tag as two separate bets (e.g., $100 and $200), the controller groups the two RFID tags as a single bet (e.g., $300). Generally, the RFID system may consider a set of RFID tags to be a group when the position of each RFID tag in the set is within a defined range (e.g., 0.75× diameters) of at least one other RFID tag in the set. For example, a "stack" of RFID tags will have similar positions (e.g., much less than 0.75× diameters), so the RFID system determines that stack to be a group. As another example, a "mound" of RFID tags may have positions that in the aggregate that are beyond the defined range, but as long as each RFID tag in the mound is within the defined range of at least one other RFID tag in the mound, the RFID system determines that mound to be a group.

Grouping may also be used in combination with the game rules (e.g., the game states and sub-states). For example, in Blackjack, a player is allowed to "double down" (to double the amount of the initial bet) in certain circumstances. In such a situation, the RFID system first uses the card data to determine that the double down is allowed. Second, the RFID system uses the RFID data to verify that an accurate doubled bet has been placed as a group with the initial bet. (The RFID system may determine the initial bet to be a first group and the doubled bet to be a second group.) Third, the RFID system uses the card data to determine if the player's hand is a winner or a loser; for a winner, the RFID system uses the chip data to verify that correct payouts have been placed as additional groups with the initial bet and the doubled bet; and for a loser, the RFID system uses the chip data to verify that all the groups (the initial bet and the doubled bet) are collected. If any of the data indicates a violation of the game rules, the RFID system may generate an alert.

The defined range that the RFID system uses to determine a group may be adjusted as desired. For example, when the defined range is 1.5× diameters, the RFID system determines that two adjacent stacks are a group.

Figure 14:
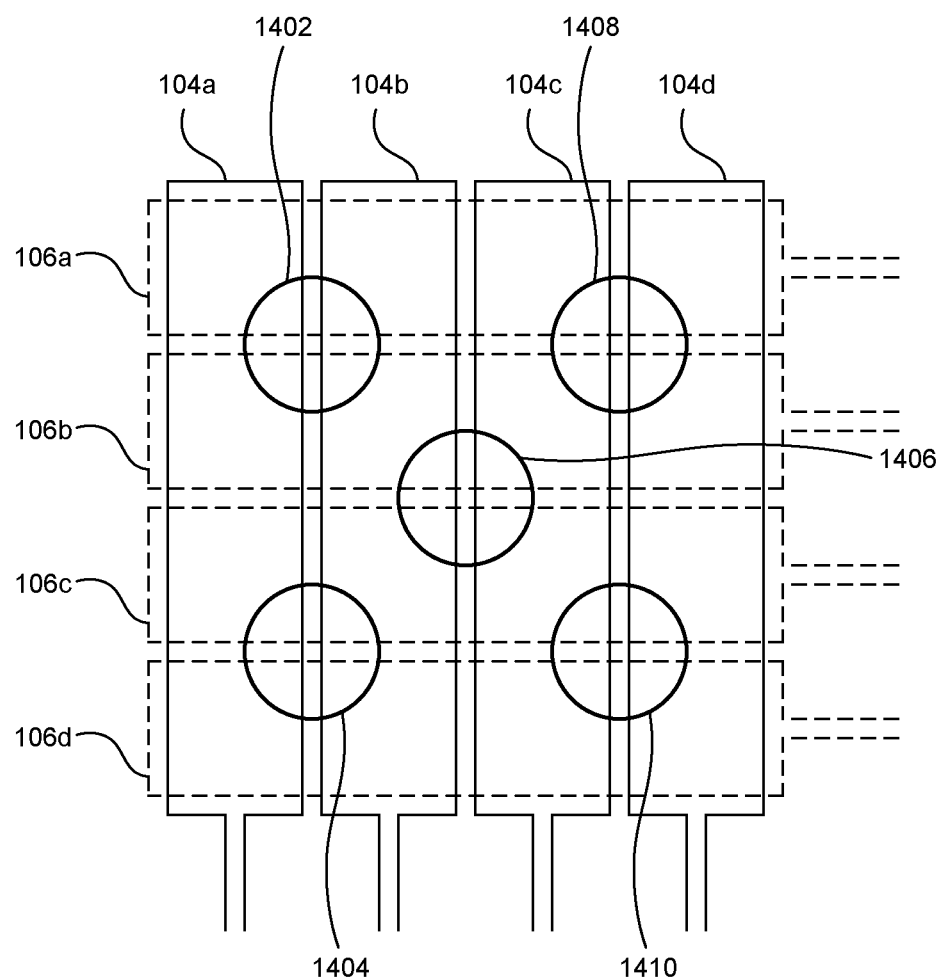
FIG. 14 is an overhead view of the antennas 104 and 106 of FIG. 1

FIG. 14 is an overhead view of the antennas 104 and 106 of FIG. 1. As compared to FIG. 5, FIG. 14 includes 5 RFID tags 1402, 1404, 1406, 1408 and 1410. Assume that each RFID tag takes 10 milliseconds (ms) to respond. Assuming no collisions, the read cycle takes 50 ms (10 ms per RFID tag): During this time, the main antenna (not shown) is energized, and the RFID reader connected to the antenna 104a receives the responses from the RFID tags 1402 and 1404; the RFID reader connected to the antenna 104*b* receives the responses from the RFID tags 1402, 1404 and 1406; the RFID reader connected to the antenna 104*c* receives the responses from the RFID tags 1406, 1408 and 1410; and the RFID reader connected to the antenna 104*d* receives the responses from the RFID tags 1408 and 1410. (These responses correspond to the "second set of responses" discussed above, at 208 in FIG. 2.) During the same time, the RFID reader connected to the antenna 106*a* receives the responses from the RFID tags 1402 and 1408; the RFID reader connected to the antenna 106*b* receives the responses from the RFID tags 1402, 1406 and 1408; the RFID reader connected to the antenna 106*c* receives the responses from the RFID tags 1404, 1406 and 1410; and the RFID reader connected to the antenna 106*d* receives the responses from the RFID tags 1404 and 1410. (These responses correspond to the "third set of responses" discussed above, at 210 in FIG. 2.)

Compare the above to a system that energizes each antenna separately (e.g., without a main antenna). In such a system, the RFID reader connected to the antenna 104*a* takes 20 ms to perform a read (10 ms for each of the RFID tags 1402 and 1404), the RFID reader connected to the antenna 104*b* takes 30 ms to perform a read (10 ms for each of the RFID tags 1402, 1404 and 1406), the RFID reader connected to the antenna 104*c* takes 30 ms to perform a read (10 ms for each of the RFID tags 1406, 1408 and 1410), and the RFID reader connected to the antenna 104*d* takes 20 ms to perform a read (10 ms for each of the RFID tags 1408 and 1410); so reading the x direction takes 100 ms (20+30+30+20). Similarly, reading the y direction also takes 100 ms, for a total read time of 200 ms. This is significantly more than the 50 ms discussed above.

Thus, the RFID systems described herein result in a notable improvement in read times as compared to existing systems that energize each antenna separately.

Additional Antenna Options

Figure 15:
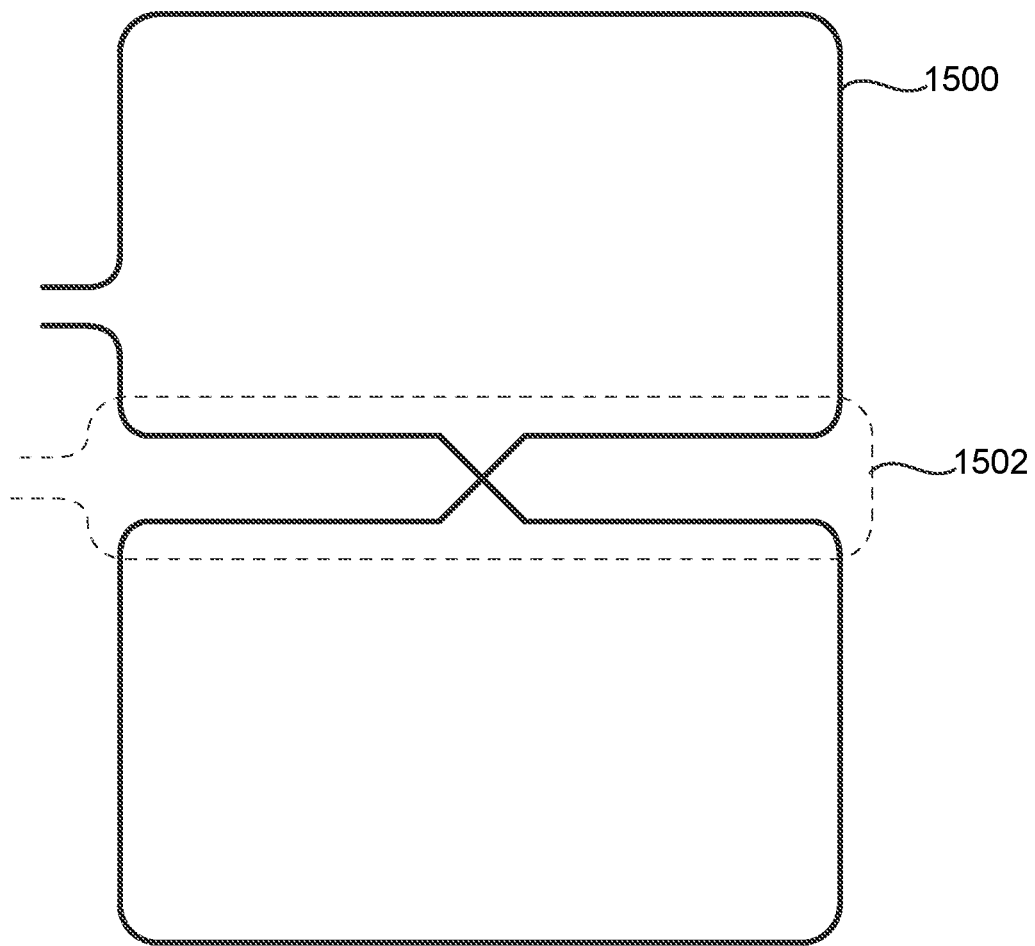
FIG. 15 is an overhead view of an antenna 1500 having a "figure 8" shape.

FIG. 15 is an overhead view of an antenna 1500 having a "figure 8" shape. The antenna 1500 may be used in the RFID systems discussed herein, such as the RFID system 100 (see FIG. 1), the RFID system 600 (see FIG. 6), the RFID system 800 (see FIG. 8), etc. In the RFID system, the antenna 1500 may be used in place of the main antennas, such as the main antenna 102 (see FIG. 1), the main antenna 602 (see FIG. 6), the main antenna 802 (see FIG. 8), etc. The antenna 1500 may connect to the transmitter 108 and the receiver 112 (see FIG. 1), to the RFID reader 608 and the receiver 612 (see FIG. 6), to the RF transmitter 808 and the receiver 812 (see FIG. 8), etc. The antenna 1500 may be used with the antenna arrays discussed herein, such as the array formed by antennas 104 and 106 (see FIG. 1), the array formed by the antennas 604 and 606 (see FIG. 6), the array formed by the antennas 804 and 806 (see FIG. 8), the antenna array 1000 (see FIG. 10), the polar antenna array 1100 (see FIG. 11), the antenna array 1202 (see FIG. 12B), the antenna array 1302 (see FIG. 13), etc.

The antenna 1500 includes two loops, referred to as the upper loop and the lower loop (corresponding to the orientation shown in FIG. 15). Where the loops cross, the wire of the antenna 1500 from one loop passes over that of the other loop, such that the antenna 1500 forms a single conductive path. (For example, a side view would show a gap between the loops where they cross, which is not evident from the overhead view.) As a result of the "figure 8" shape, the phase of the field of one loop is opposite that of the other loop (e.g., a 180 degree phase difference).

The antenna 1500 results in a null in the field where the loops cross to form the "figure 8" (e.g., along the horizontal centerline of the antenna 1500 as shown in FIG. 15). (In the null, the RFID tags cannot be read.) To overcome the null, an antenna 1502 may be placed where the loops cross on the antenna 1500. The antenna 1502 may be connected to the transmitter and the receiver (e.g., 108 and 112 in FIG. 1), selectively with the antenna 1500 (e.g., using a switch, multiplexer, etc.), as controlled by the controller (e.g., 120 in FIG. 1). The controller (e.g., 120) may control the transmitter and the receiver (e.g., 108 and 112) to perform a first read (e.g., generating an RFID inventory command) using the antenna 1500, and to perform a second read (e.g., generating a second RFID inventory command) using the antenna 1502. Any RFID tags that do not respond to the first read due to the null instead respond to the second read, thereby overcoming the null.

Alternatively, the antenna 1502 may be omitted, for example if the null is associated with a location in which it is undesired to read RFID tags (e.g., the null occurs in an area without a betting spot).

The shape and size of the antenna 1500 may be varied as desired. Instead of two similarly-shaped and similarly-sized loops as shown in FIG. 15, the loops may have different sizes, different lengths, different widths, etc. For example, one loop may have a smaller width and the other loop may have a larger width. As another example, one loop may have a smaller length and the other loop may have a larger length. The number of loops may be varied in the "figure 8" antenna, for example to have four loops, six loops, etc.

Figure 16:
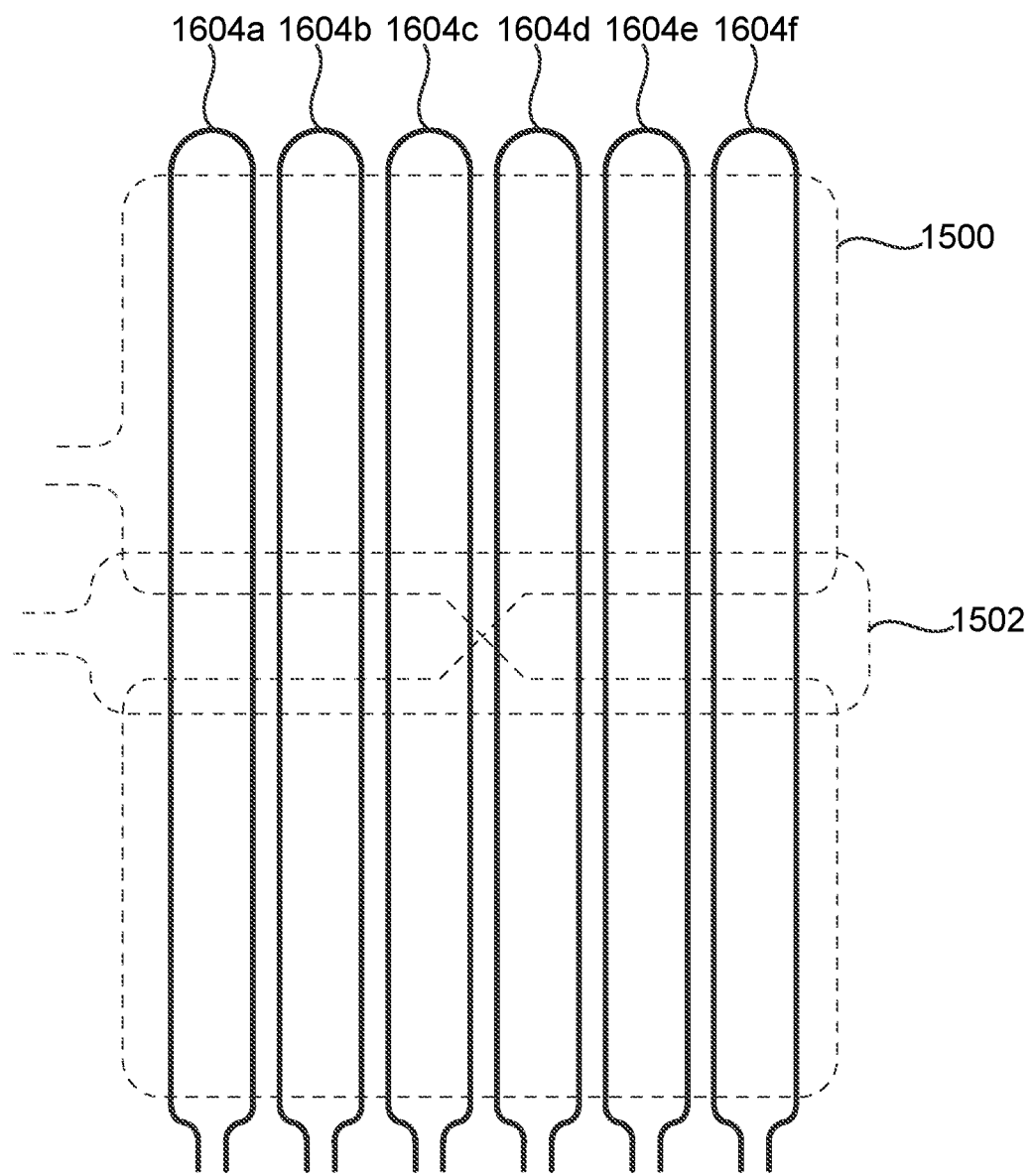
FIG. 16 is an overhead view of antennas 1604.

FIG. 16 is an overhead view of antennas 1604 (6 shown: 1604*a*, 1604*b*, 1604*c*, 1604*d*, 1604*e* and 1604*f*). The antennas 1604 may be referred to as vertical antennas as this corresponds to the view in FIG. 16. The antennas 1604 may be used with the antenna 1500 (see FIG. 15, as well as optionally the antenna 1502). (The antennas 1500 and 1502 are shown in FIG. 16 with dotted lines to reduce the number of line crossings.) The antennas 1604 may be used in the RFID systems discussed herein, such as the RFID system 100 (see FIG. 1), 600 (see FIG. 6), 800 (see FIG. 8), etc. In the RFID system, the antennas 1604 may be used in place of similar antennas such as the antennas 104 (see FIG. 1), 604 (see FIG. 6), 804 (see FIG. 8), 900 (see FIG. 9), the set of antennas in a first orientation in FIG. 10 (e.g., 1004*a*, 1004*b*, 1004*c* and 1004*d*), the set of antennas in a second orientation in FIG. 10 (e.g., 1004*e*, 1004*f*, 1004*g*, 1004*h* and 1004*i*), the antennas 1204 or 1206 (see FIG. 12B), the antennas 1304 or 1306 (see FIG. 13), etc.

A noteworthy feature of the antennas 1604 is that each one crosses over both loops of the antenna 1500. As a result, the antenna 1500 cancels out the carrier signal (e.g., 13.56 MHz) received by the antennas 1604, making the sideband signal (which has the tag ID) easier to detect. For example, the antenna 1604*a* has a much easier job of detecting the sideband responses from the RFID tags sitting atop the antenna 1604*a*. In general, the antennas 1604 are not "figure 8" antennas.

In general, the width of the antennas 1604 corresponds to the size of the RFID tokens. According to an embodiment, the antennas 1604 have a width of 1.5 inches. The size of the antennas 1604 may be adjusted as desired.

As an alternative, the antennas 1604 may be overlapping in a manner similar to the antennas 900 (see FIG. 9). For example, when the antennas 1604 have a width of 1.5 inches, adjacent antennas may overlap by 0.25 inches.

Figure 17:
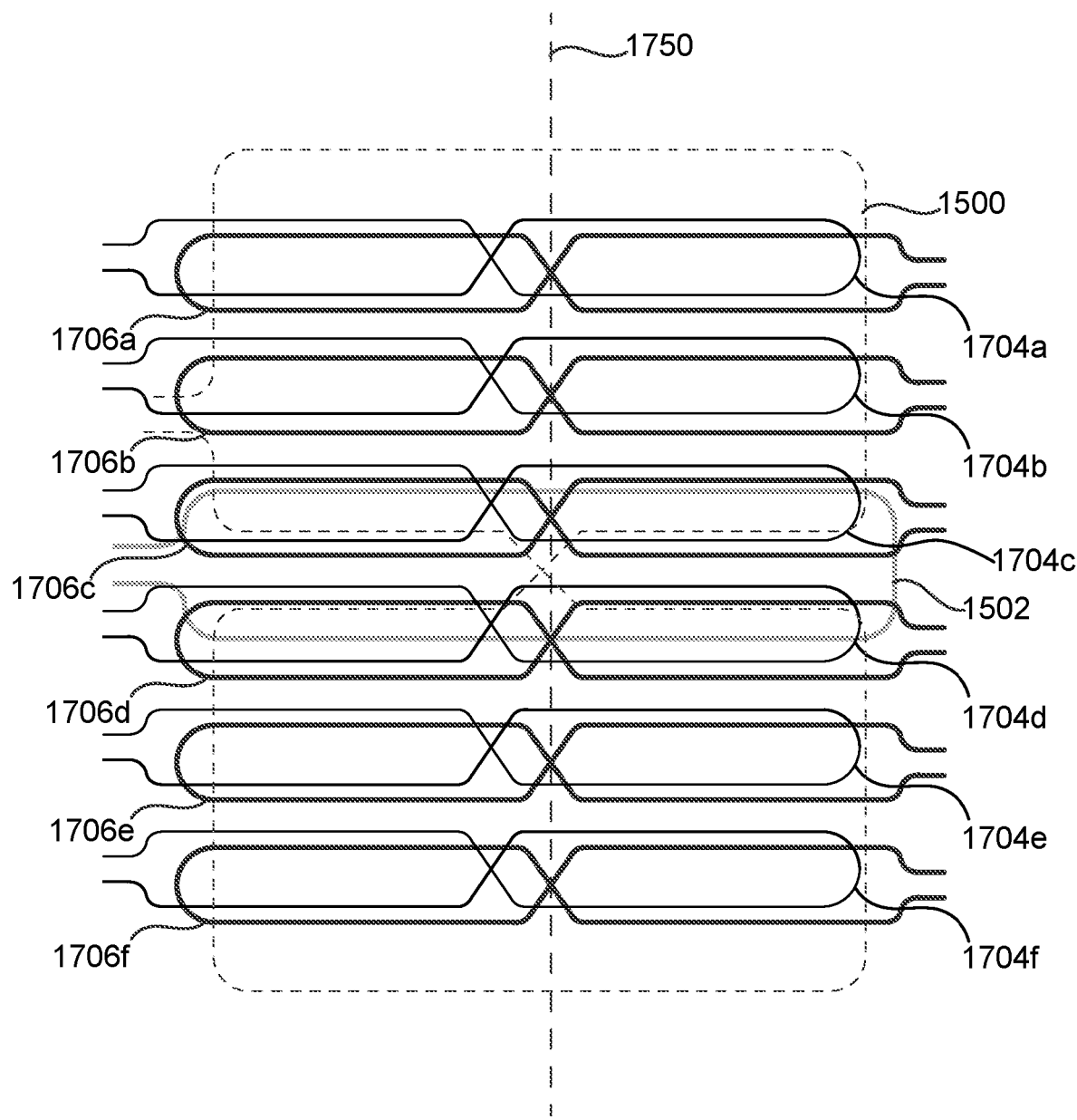
FIG. 17 is an overhead view of antennas 1706.

FIG. 17 is an overhead view of antennas 1704 (6 shown: 1704*a*, 1704*b*, 1704*c*, 1704*d*, 1704*e* and 1704*f*) and 1706 (6 shown: 1706*a*, 1706*b*, 1706*c*, 1706*d*, 1706*e* and 1706*f*). (To reduce the clutter, the antennas 1704 are shown dotted and slightly offset from the antennas 1706.) The antennas 1704 and 1706 may be referred to as horizontal antennas as this corresponds to the view in FIG. 17. The antennas 1704 and 1706 may be used with the antenna 1500 (see FIG. 15, as well as optionally the antenna 1502), and with the antennas 1604 (see FIG. 16). (The antennas 1500 and 1502 are shown in FIG. 17 with dotted lines to reduce the number of line crossings; the antennas 1604 are not shown.) The antennas 1704 and 1706 may be used in the RFID systems discussed herein, such as the RFID system 100 (see FIG. 1), 600 (see FIG. 6), 800 (see FIG. 8), etc. In the RFID system, the antennas 1704 and 1706 may be used in place of similar antennas such as the antennas 106 (see FIG. 1), 606 (see FIG. 6), 806 (see FIG. 8), 900 (see FIG. 9), the set of antennas in a first orientation in FIG. 10 (e.g., 1004*a*, 1004*b*, 1004*c* and 1004*d*), the set of antennas in a second orientation in FIG. 10 (e.g., 1004*e*, 1004*f*, 1004*g*, 1004*h* and 1004*i*), the antennas 1204 or 1206 (see FIG. 12B), the antennas 1304 or 1306 (see FIG. 13), etc.

A noteworthy feature of the antennas 1704 and 1706 is that they are "figure 8" antennas like the antenna 1500. Another noteworthy feature of the antennas 1704 and 1706 is that each one does not cross over both loops of the antenna 1500. However, since both loops of each particular one of the antennas 1706 do cross over a single loop of the antenna 1500, the carrier signal cancellation feature (described above for FIG. 16) is also applicable to the antennas 1704 and 1706.

However, the "figure 8" shape of the antennas 1706 results in a null in the field where the loops cross to form the "figure 8" along line 1750, similar to the null discussed above for FIG. 15. However, different from the strategy employed in FIG. 15 to use the antenna 1502, FIG. 17 uses the antennas 1704. The crossover points of the antennas 1704 are offset from the vertical center line 1750 of the antennas 1706, where the loops cross and where the null occurs. Thus, where there is a null in one of the antennas 1706 there is not in the corresponding one of the antennas 1704, and vice versa. In this manner, the nulls of both the antennas 1704 and 1706 may be overcome.

As with the antenna 1502 (see FIG. 15), the antennas 1704 may be omitted, for example if the null of the antennas 1706 is associated with a location in which it is undesired to read RFID tags (e.g., the null occurs in an area without a betting spot).

Figure 18:
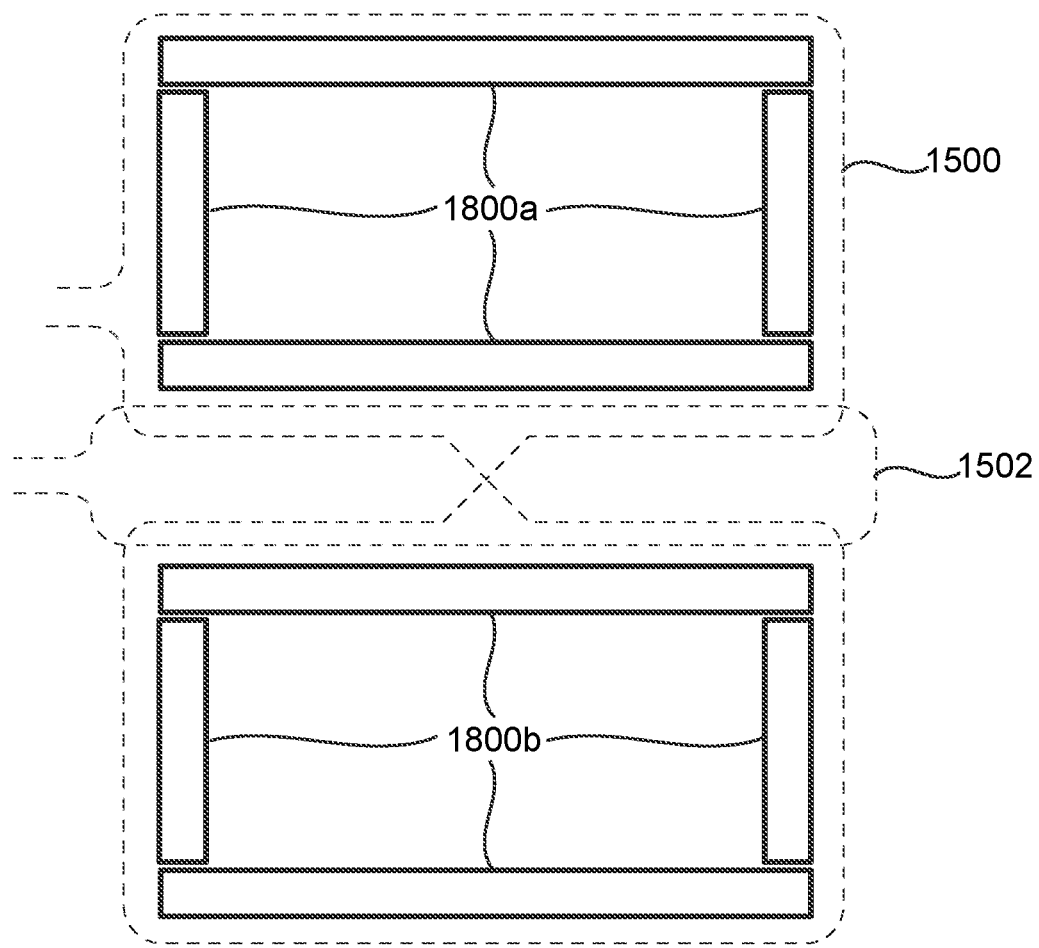
FIG. 18 is an overhead view of conductive traces 1800.

FIG. 18 is an overhead view of conductive traces 1800. The conductive traces 1800 may be made from copper. The conductive traces 1800 may be etched onto a printed circuit board (e.g., that may also contain one or more of the antennas, etc.) or may be formed using copper tape. The conductive traces 1800 may be used with the "figure 8" antenna 1500 (see FIG. 15, and also with the optional antenna 1502), shown in FIG. 18 with dotted lines to reduce the number of line crossings. The field of the antenna 1500 is not uniform; it is concentrated near the null between the two loops and around the perimeter of each loop. The conductive traces 1800 generally correspond to an interior border of each loop of the antenna 1500, shown as the portions 1800*a* and 1800*b*. The conductive traces 1800 result in the field being more uniform with little loss in field strengths. The uniformity of the field allows the antenna power to be reduced while still being able to read RFID tags anywhere within the area of the antenna.

When the conductive traces 1800 are formed using copper tape, each conductive tape portion (e.g., 1800*a*) may be formed from multiple tape portions as shown, e.g. as 4 tape portions arranged as the sides of a rectangle. When the conductive traces 1800 are etched onto a printed circuit board, each portion (e.g., 1800*a*) may be etched as a single continuous trace, or as multiple traces (similar to the tape portions).

Multiplexer

Figure 19:
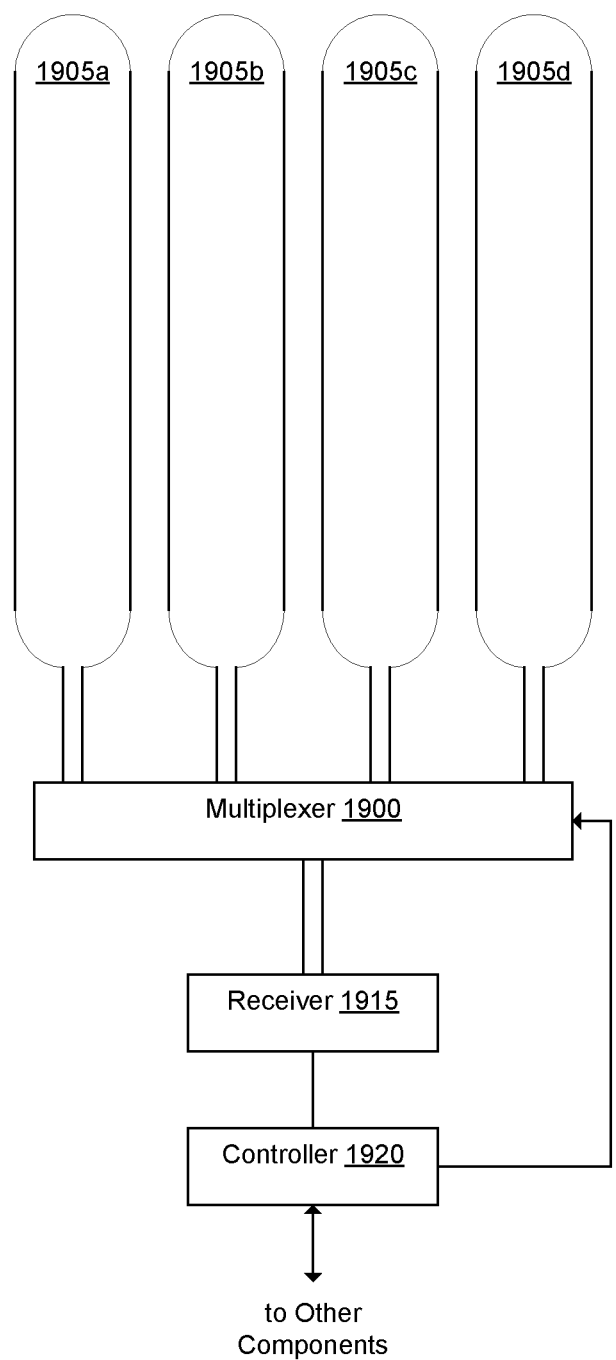
FIG. 19 is a block diagram of a multiplexer 1900.

FIG. 19 is a block diagram of a multiplexer 1900. The multiplexer 1900 may be used with any of the RFID systems described herein (e.g., the RFID system 100 of FIG. 1, the RFID system 600 of FIG. 6, the RFID system 800 of FIG. 8, etc.). The multiplexer 1900 connects to two or more antennas 1905 (4 shown: 1905*a*, 1905*b*, 1905*c* and 1905*d*) and to an RFID receiver 1915. The multiplexer 1900 is controlled by a controller 1920.

The antennas 1905 may be similar to the antennas described herein, such as the antennas 104 or 106 (see FIG. 1), 604 or 606 (see FIG. 6), 804 or 806 (see FIG. 8), 900 (see FIG. 9), 1004 (see FIG. 10), 1104 (see FIG. 11), 1204 or 1206 (see FIG. 12B), 1304 or 1306 (see FIG. 13), 1604 (see FIG. 16), 1706 (see FIG. 17), etc. The RFID receiver 1915 may be similar to the RFID receivers described herein, such as the RFID receivers 114 or 116 (see FIG. 1), 614 or 616 (see FIG. 6), 700 (see FIG. 7), 814 or 816 (see FIG. 8), etc. The controller 1920 may be similar to the controllers described herein, such as the controller 120 (see FIG. 1), 620 (see FIG. 6), 820 (see FIG. 8), etc.

In general, the multiplexer 1900 allows the number of receivers to be reduced in the RFID system. Consider the RFID system 100 of FIG. 1. The main RFID receiver 112 reads the serial numbers of the RFID tag. The other receivers such as 114*a*-114*d* and 116*a*-116*d* only need to determine the amplitude and/or phase of the signal from the RFID tag. The amplitude and/or phase of the RFID tag signal can be determined in a small fraction of the total RFID tag transmission. This allows the use of a single receiver (e.g., 1915) to read multiple antennas all within the transmission time of the RFID tag. The controller 1920 controls the multiplexer 1900 to selectively route the signals received by the antennas 1905 to the receiver 1915. When the main RFID receiver 112 determines that a RFID tag may be transmitting, the controller 1920 selects one of the antennas (e.g., 1905*a*) and measures the amplitude and/or phase received by the receiver 1915. The controller 1920 dwells on that antenna for a fraction of the RFID tag transit time (e.g., about ⅛th the RFID tag transit time). The controller 1920 then does the same for the other antennas (e.g., 1905*b*-1905*d*) in the following fractional time windows. At the completion of the RFID tag transmission, the controller 1920 then uses the received amplitude and/or phase from all the antennas 1905 to determine the location of the RFID tag.

For example, in the RFID system 100 (see FIG. 1), one or more of the receivers (e.g., one or more of 114 and 116) may be removed, and the outputs from two or more antennas (e.g., two or more of 104, 106) may be routed through the multiplexer 1900 to the RFID receiver 1915. The controller 1920 controls the multiplexer 1900 to selectively connect each of the antennas (104, 106, etc.) to the receiver 1915. In this manner, the single RFID receiver 1915 may connect through the multiplexer 1900 to selectively read each of the antennas (e.g., 104 and 106). The multiplexer 1900 may be used in a similar manner regarding the RFID system 600 (see FIG. 6), the RFID system 800 (see FIG. 8), etc.

An example of using only phase information with the overlapping antennas 900 (see FIG. 9) is as follows. (This example determines the position on the x-axis.) For a particular detected RFID tag, the RFID system normalizes the phase of the antenna with the largest signal strength (e.g., 900*b*) to zero degrees and looks at the phase detected at the adjacent antennas (e.g., 900*e* and 900*f*). If both the adjacent antennas have the opposite phase (e.g., 180 degrees), the position of the RFID tag is determined to be in the center of the antenna 900*b* (e.g., where the antennas 900*e* and 900*f* do not overlap with 900*b*). If one antenna (e.g., 900*e*) has the same phase (e.g., zero degrees) and the other antenna (900*f*) has the opposite phase (e.g., 180 degrees), the position of the RFID tag is determined to be on the left side of the antenna 900*b* (e.g., where the antennas 900*b* and 900*f* overlap). The y-axis direction may be determined in a similar manner (e.g., using a set of antennas oriented in the other direction).

Figure 20:
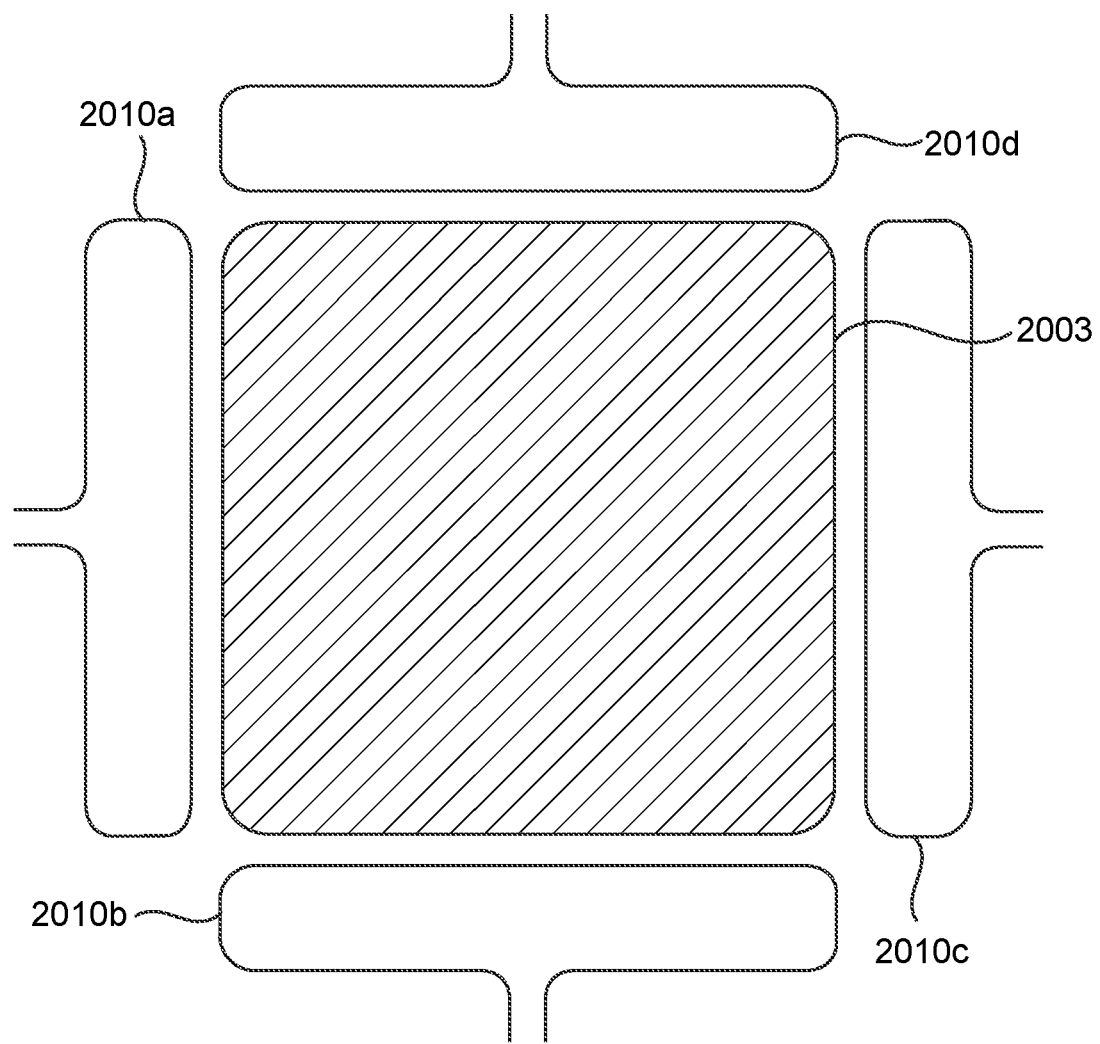
FIG. 20 is an overhead view of an antenna arrangement 2000.

FIG. 20 is an overhead view of an antenna arrangement 2000. The antenna arrangement 2000 includes one or more antennas (not individually shown) that are associated with an area 2003 and one or more antennas 2010 (4 shown: 2010*a*, 2010*b*, 2010*c* and 2010*d*). The antennas in the antenna arrangement 2000 may connect to other components of an RFID system discussed herein, such as an RFID reader (see, e.g., FIG. 1, FIG. 6, FIG. 8, etc.), a multiplexer (see FIG. 19), etc.

The area 2003 generally corresponds to a read area (e.g., a betting spot on a gaming table), and the antennas associated with the area 2003 may be similar to one or more of the antennas discussed herein (e.g., the antennas 102 or 104 or 106 of FIG. 1; the antennas 602 or 604 or 606 of FIG. 6; the antennas 802 or 804 or 806 of FIG. 8; the antennas 900 of FIG. 9; the antennas 1004 of FIG. 10; the antenna array 1100 of FIG. 11; the antenna array 1302 of FIG. 13; the antennas 1500 or 1502 of FIG. 15; the antennas 1604 of FIG. 16; the antennas 1704 or 1706 of FIG. 17; the antennas 1905 of FIG. 19; etc.).

The antennas 2010 may be referred to as outside antennas because they are outside the area 2003. The return flux path of the antennas associated with the area 2003 may extend outside of the area 2003, and may thus energize RFID tags that are outside of the betting area. If an RFID tag outside the area 2003 is energized, one or more of the outside antennas 2010 receive the signal from that RFID tag. If the RFID system detects that the received signal level for that RFID tag is greater at one of the antennas 2010 than at one of the antennas associated with the area 2003, then the system may exclude that RFID tag from being associated with the area 2003. In this manner, the RFID system more accurately detects that the RFID tag is within the area 2003, instead of nearby (but outside) the area 2003.

Figure 21A:
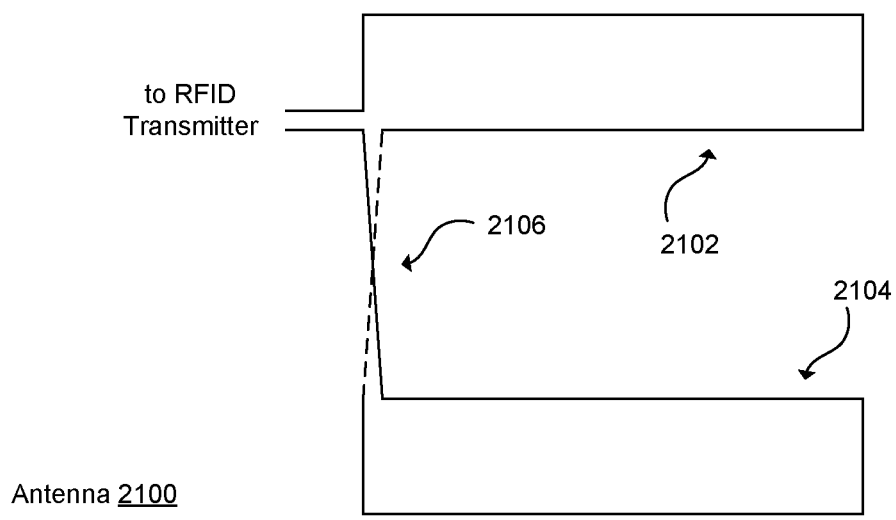
FIG. 21A is an overhead view of an antenna 2100 having a "figure 8" shape.

FIG. 21A is an overhead view of an antenna 2100 having a "figure 8" shape. The antenna 2100 is similar to the antenna 1500 (see FIG. 15) with different loop sizes and arrangements. The antenna 2100 includes a first loop 2102, a second loop 2104, and a transition portion 2106. As with the antenna 1500, the wire of the loops 2102 and 2104 crosses (without touching) in the transition portion 2106 so that the antenna 2100 forms a single conductive path; as a result of the "figure 8" shape, the phase of the field of one loop is opposite that of the other loop (e.g., a 180 degree phase difference). (One of the wires in the transition portion 2106 is shown dashed to indicate that it does not connect to the other wire in the transition portion 2106.) The transition portion 2106 is located to the side, so the related null area is also along the side (as further discussed with reference to FIG. 21B). In addition, the narrow transition of the transition portion 2106 also reduces the size of the related null area. The antenna 2100 connects to an RFID transmitter (not shown), such as the transmitter 108 (see FIG. 1), the RFID reader 608 (see FIG. 6), etc.

The shape and size of the antenna 2100 may be adjusted as desired. The loops 2102 and 2104 are shown as being generally rectangular; this shape may be adjusted to have rounded corners, for example. As another example, the width of each loop may correspond to the size of the RFID tags (e.g., approximately 1.5 inches), and the length of the loops may correspond to the length of the read area, as further discussed with reference to FIG. 21B.

Figure 21B:
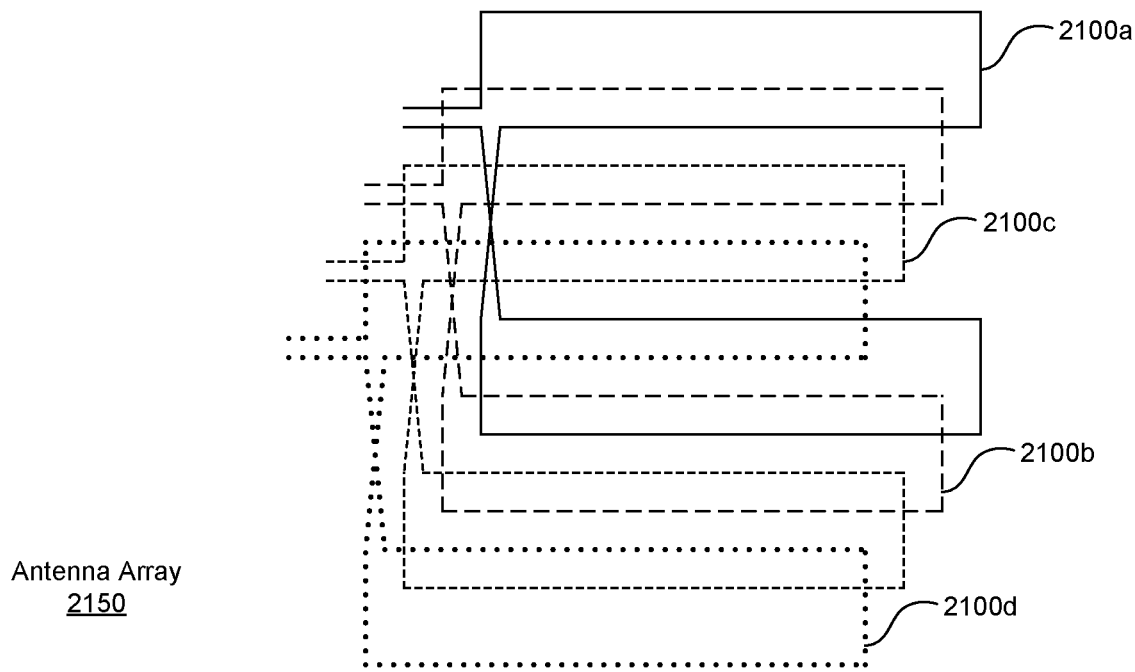
FIG. 21B is an overhead view of an antenna array 2150.

FIG. 21B is an overhead view of an antenna array 2150. The antenna array 2150 includes a number of antennas corresponding to the antenna 2100 (see FIG. 21A); four antennas are shown, labeled 2100*a*, 2100*b*, 2100*c* and 2100*d*. In order to reduce the clutter, the antennas 2100*b*, 2100*c* and 2100*d* are shown with dashed lines and are shown slightly offset to the left. (Note that in each transition portion, the wires cross but do not connect, as discussed with reference to FIG. 21A.) According to an embodiment, the transition portions of each of the antennas 2100*a*, 2100*b*, 2100*c* and 2100*d* may be generally overlapping, in contrast to the offset as shown in FIG. 21B.

The antenna array 2150 may be used in the RFID systems discussed herein, such as the RFID system 100 (see FIG. 1), the RFID system 600 (see FIG. 6), the RFID system 800 (see FIG. 8), etc. In the RFID system, the antenna array 2150 may be used in place of the main antennas, such as the main antenna 102 (see FIG. 1), the main antenna 602 (see FIG. 6), the main antenna 802 (see FIG. 8), the main antenna 1500 (see FIGS. 15-18), etc. The antenna array 2150 may connect to the transmitter 108 and the receiver 112 (see FIG. 1), to the RFID reader 608 and the receiver 612 (see FIG. 6), to the RF transmitter 808 and the receiver 812 (see FIG. 8), etc. The antenna 1500 may be used with the antenna arrays discussed herein, such as the array formed by antennas 104 and 106 (see FIG. 1), the array formed by the antennas 604 and 606 (see FIG. 6), the array formed by the antennas 804 and 806 (see FIG. 8), the antenna array 1000 (see FIG. 10), the polar antenna array 1100 (see FIG. 11), the antenna array 1202 (see FIG. 12B), the antenna array 1302 (see FIG. 13), etc.

The antenna array 2150 may be associated with a read area of a gaming table, such as the read areas of the gaming tables shown in FIGS. 12A-12B and 13. The number of antennas in the antenna array 2150 may be adjusted as desired to cover the width of a given read area. For example, when the width of each loop is approximately 1.5 inches (see the discussion above regarding FIG. 21A), the antenna array 2150 covers a width of approximately 12 inches. The length of each loop is sized to cover the length of the read area.

As mentioned with reference to FIG. 21A, one null area of each antenna in the antenna array 2150 is associated with the transition portion, which is at the side (e.g., the left side as shown). However, due to the overlap of the antennas (e.g., 2100*b* overlaps 2100*a*, etc.), the null area of each antenna is at least partially covered by the non-null area of another antenna. As a result, the null area of the antenna array 2150 in the aggregate is reduced. Furthermore, because the null area is at the side, the length of the antennas in the antenna array 2150 may be sized to fully cover the length of the read area, with the transition portions being placed outside of the read area.

Each antenna in the antenna array 2150 also has a null between the loops (e.g., between the loops 2102 and 2104 in FIG. 21A). However, again due to the overlap of the antennas (e.g., 2100*b* overlaps 2100*a*, etc.), this central null is at least partially covered by the non-null areas of the other antennas.

As compared to the other main antennas (e.g., 102, 602, 802, 1500, etc.), the antenna array 2150 allows for a greater flux density for a given power level. This is because for a given power level, the flux density decreases as the size increases. For example, for a given power level, the antenna array 2150 has a greater flux density than that of the antenna 1500.

Figure 22:
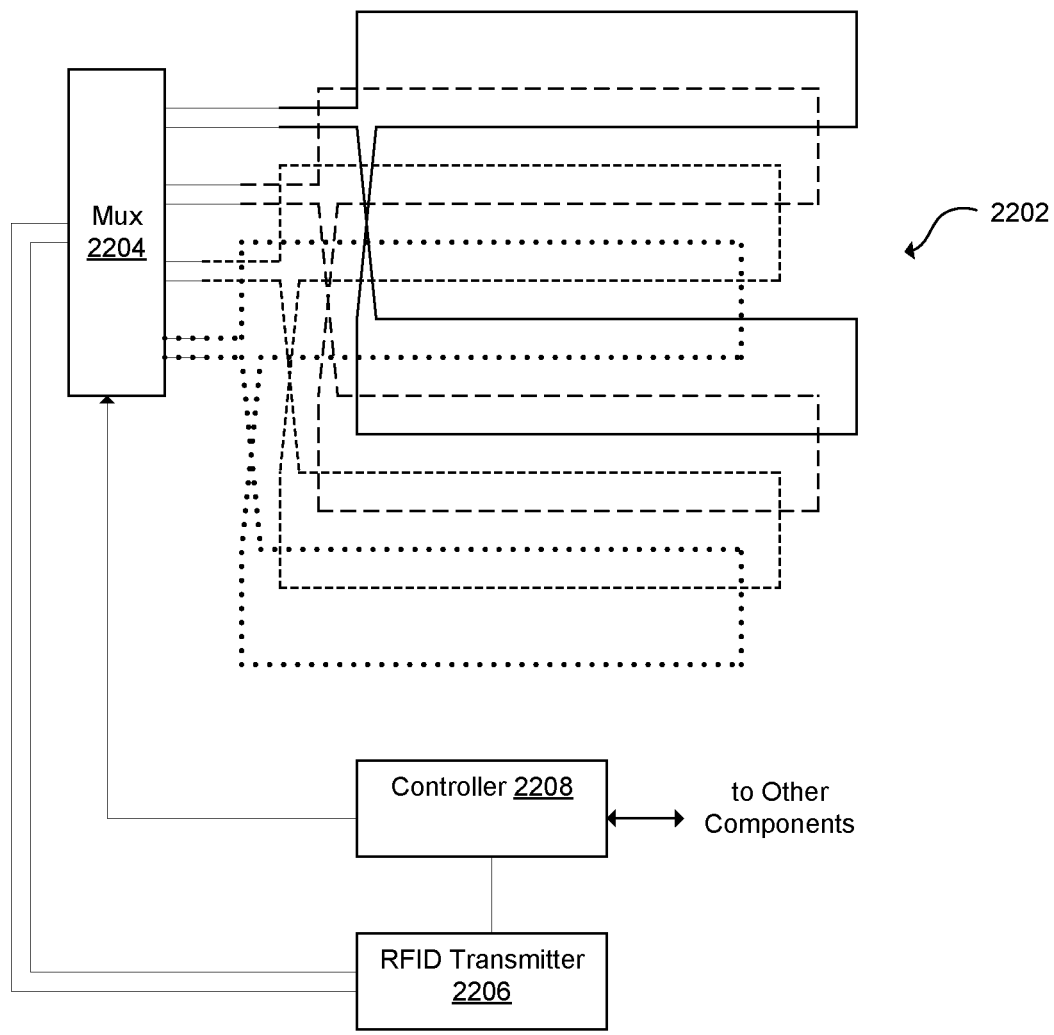
FIG. 22 is a block diagram of an RFID transmit system 2200.

FIG. 22 is a block diagram of an RFID transmit system 2200. The RFID transmit system 2200 may be used with any of the RFID systems described herein (e.g., the RFID system 100 of FIG. 1, the RFID system 600 of FIG. 6, the RFID system 800 of FIG. 8, etc.). In general, the RFID transmit system 2200 energizes RFID tags, and may be used in an RFID system in a manner similar to that of the transmitter 108 and the main antenna 102 of FIG. 1, for example. The RFID transmit system 2200 includes a plurality of transmit antennas 2202, a multiplexer 2204, a RFID transmitter 2206, and a controller 2208.

The transmit antennas 2202 generally correspond to an antenna array such as the antenna array 2150 of FIG. 21B. As with the antenna array 2150, the transmit antennas 2202 are shown slightly offset and with differing dashed lines. According to an embodiment, the transmit antennas 2202 are generally overlapping with the transition portions (see FIG. 21A) also overlapping along the left side of the antenna array.

The multiplexer 2204 selectively connects one of the antennas of the transmit antennas 2202 to the RFID transmitter 2206, as controlled by the controller 2208. The RFID transmitter 2206 transmits a radio frequency signal to energize RFID tags, in a manner similar to that of the transmitter 108 (see FIG. 1), the RFID reader 608 (see FIG. 6), the RF transmitter 808 (see FIG. 8), etc. The controller 2208 controls the multiplexer 2204 and connects to other components of the RFID system (not shown), in a manner similar to that of the controller 120 of FIG. 1, for example.

In a manner similar to the multiplexer 1900 (see FIG. 19) for the receive system, the RFID transmit system 2200 allows the number of transmitters to be reduced in the RFID system.

Figure 23A:
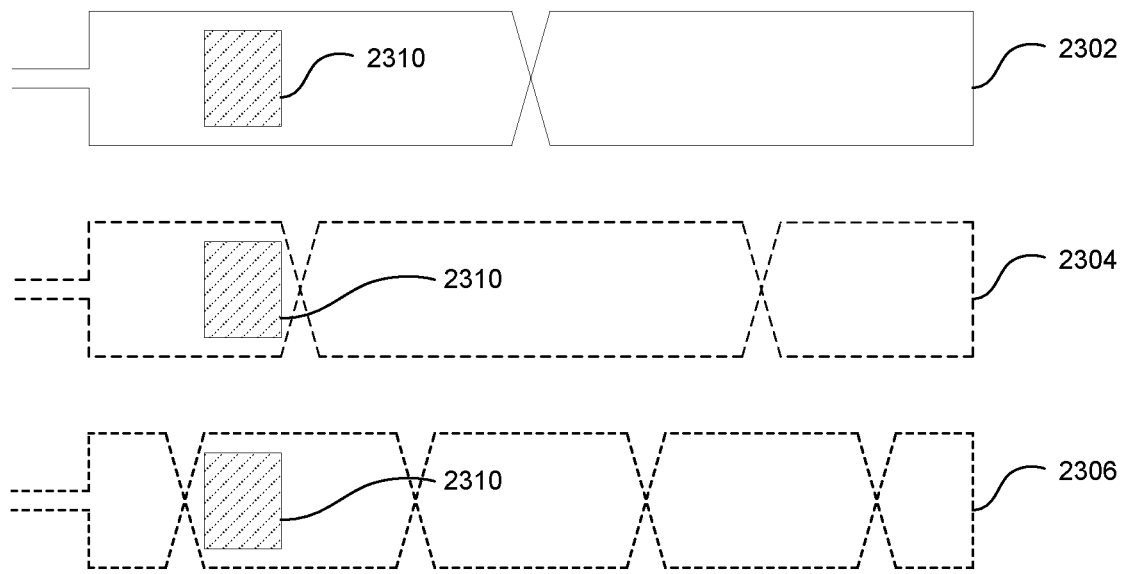
FIGS. 23A-23B are views of an antenna group 2300 that includes three antennas 2302, 2304 and 2306.
Figure 23B:
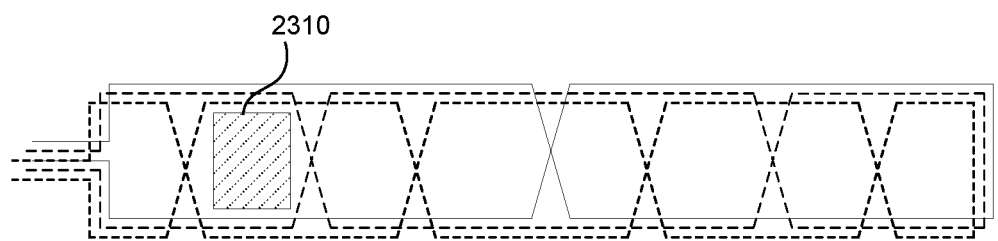

FIGS. 23A-23B are views of an antenna group 2300 that includes three antennas 2302, 2304 and 2306. FIG. 23A is an overhead view showing the antennas 2302, 2304 and 2306 separated and un-stacked. FIG. 23B is an overhead view showing the antennas 2302, 2304 and 2306 stacked together to form the antenna group 2300. To improve the visualization, the antenna 2304 is shown dashed and the antenna 2306 is shown dotted, and the antennas 2304 and 2306 are shown slightly offset in the antenna group 2300.

The antennas 2302, 2304 and 2306 have multiple loop transitions, e.g. have multiple "figure 8" loops. As with the other "figure 8" antennas herein (e.g., FIGS. 15, 17, 21-22, etc.), the wires cross but do not connect in each transition portion, so that the wire forming the antenna is a single, continuous antenna wire. The antenna 2302 has two loops and one transition portion. The antenna 2304 has three loops and two transition portions. The antenna 2306 has five loops and four transition portions. The "figure 8" shape allows adjacent loops of the antennas to have opposite phases. For example, using binary code for the phase, the left loop of the antenna 2302 is "0" and the right loop is "1". For the antenna 2304, the left loop is "0", the center loop is "1", and the right loop is "0". For the antenna 2306, the left loop is "0", the left-center loop is "1", the center loop is "0", the right-center loop is "1", and the right loop is "0". The RFID system may then use the phase of the RFID tag detected by each antenna to determine the position of the RFID tag, in a manner similar to that described above.

The antennas 2302, 2304 and 2306 are configured in a reflected binary code arrangement (also referred to as a Gray code arrangement). In a reflected binary code arrangement, for a given area between two adjacent transition portions, the adjacent areas differ by only a single antenna. In addition, no two transition portions of the antennas in the antenna group 2300 are stacked above each other. For example, the area 2310 in FIG. 23B is "001", where the antenna 2302 provides the most-significant bit "0", the antenna 2304 provides the next-most-significant bit "0", and the antenna 2306 provides the least-significant bit "1". The adjacent area to the left is then "000", which is provided by the same two antennas 2302 and 2304, only differing in the antenna 2306. Similarly, the adjacent area to the right is "011", which is provided by the same two antennas 2302 and 2306, only differing in the antenna 2304.

Arranging the antenna group 2300 in the reflected binary code arrangement provides a benefit when an RFID tag is located above a transition portion. When the RFID tag is located above a loop, the phase information is easily read and is not very susceptible to noise or fluctuations. However, when the RFID tag is located above a transition portion, the phase information is susceptible to noise and fluctuations. (For example, the RFID tag fluctuates between the phase of the loop to the left and the phase of the loop to the right.) The reflected binary code arrangement ensures that at most one antenna at a time will have fluctuations.

In addition to using the phase information to determine the position of RFID tags, the RFID system may also use amplitude information, in a manner similar to that described above. Using amplitude information is especially helpful when the RFID tag is located above a transition portion and the phase information fluctuates. The angle of the wires in the transition portion results in different amplitude measurements for the various positions of the RFID tag above the transition portion. In a configuration phase, the amplitude measurements of the antenna may be characterized for various locations. In an active phase, the position of the RFID tag may be determined by interpolating the measured amplitude value according to the characterized amplitude and location information. The angle of the wires in the transition portion may be adjusted as desired. A narrower transition portion results in a smaller area where the phase information is in flux, but has a faster transition of the measured amplitude information for the various positions. A wider transition portion results in a larger area where the phase information is in flux, but has a slower transition of the measured amplitude information for the various positions.

The number of antennas in the group may be adjusted as desired to give the desired number of detection areas. For example, the antenna group 2300 has three antennas and thus 8 location areas (using only the phase information). Four antennas would give 16 location areas, etc. In addition, using amplitude information allows the system to determine additional locations than those detected using only the phase information.

The antennas in the antenna group 2300 may be connected to a multiplexer in a manner similar to that described above regarding FIG. 19.

Figure 24:
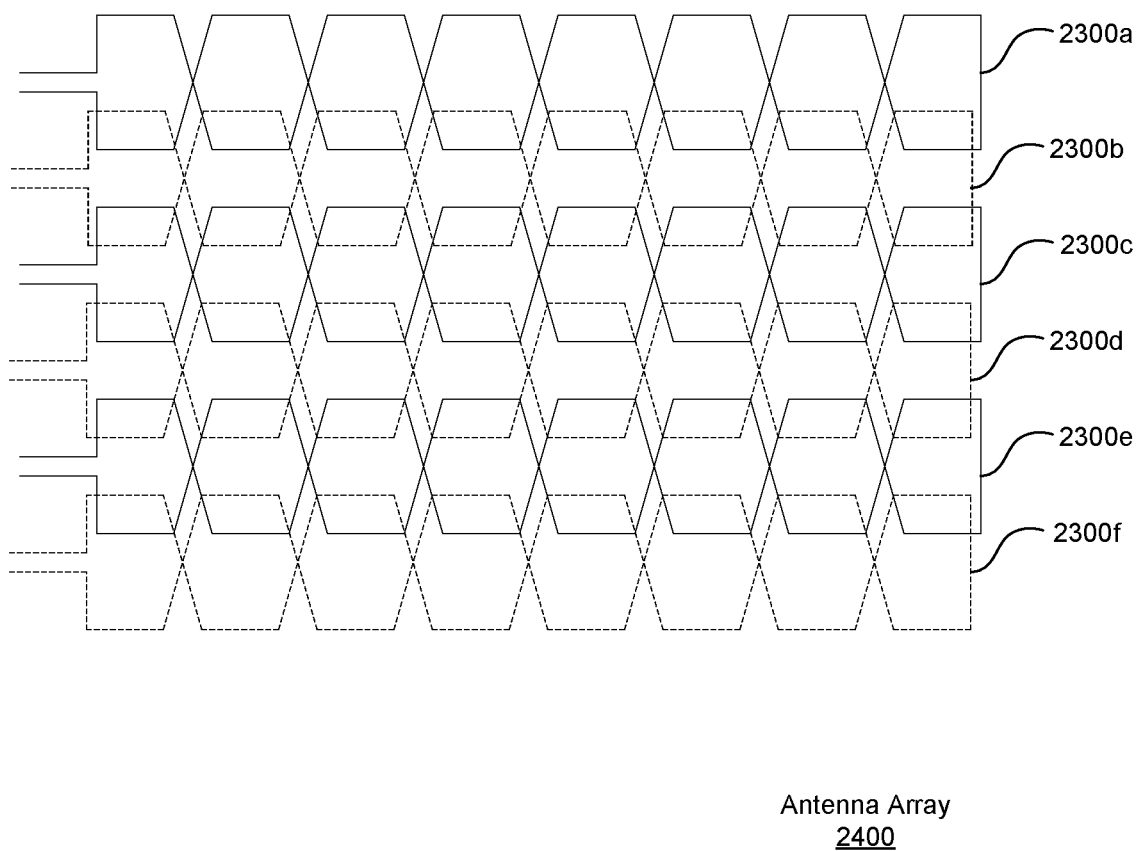
FIG. 24 is an overhead view of an antenna array 2400.

FIG. 24 is an overhead view of an antenna array 2400. The antenna array 2400 includes six overlapping antenna groups 2300 (see FIG. 23B), labeled 2300a, 2300b, 2300c, 2300d, 2300e and 2300f. To differentiate the antenna groups, the antenna groups 2300b, 2300d and 2300f are shown with dashed lines, and are slightly offset. In addition, all the antennas in a group are shown using the same type of line; it is to be understood that in actuality each antenna group is formed with three separate "figure 8" antennas in a reflected binary code arrangement as shown in FIG. 23B.

The antenna array 2400 may be used with any of the RFID systems described herein (e.g., the RFID system 100 of FIG. 1, the RFID system 600 of FIG. 6, the RFID system 800 of FIG. 8, etc.). In general, the antenna array 2400 operates to receive the RFID signals, in a manner similar to the antennas 104 and 106 (see FIG. 1), the antennas 604 and 606 (see FIG. 6), the antennas 804 and 806 (see FIG. 8), etc. However, instead of having sets of antennas oriented in different directions, the antenna array 2400 determines the y-position by determining which antenna group is detecting the RFID signal, and determines the x-position by determining which antennas in the antenna group are detecting the RFID signal. With the antenna array 2400, the RFID system may use phase information, amplitude information, a combination of phase information and amplitude information, etc. to determine the positions of the RFID tags.

The antennas in the antenna array 2400 may be connected to a multiplexer in a manner similar to that described above regarding FIG. 19.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A system for determining locations of objects in a gaming environment, the system comprising:
   a plurality of main antennas associated with an area on a gaming table, wherein each of the plurality of main antennas has a "figure 8" shape;
   a first plurality of antennas oriented in a first direction and associated with the area on the gaming table;
   a second plurality of antennas oriented in a second direction, wherein the second direction differs from the first direction, wherein the second plurality of antennas overlaps the first plurality of antennas, and wherein the first plurality of antennas and the second plurality of antennas intersect at a plurality of locations within the area;
   a main radio frequency identification (RFID) transmitter coupled to the plurality of main antennas;
   an RFID receiver; and
   a controller that controls the main RFID transmitter to generate an RFID inventory command, wherein each of a plurality of RFID tags in the area responds to the RFID inventory command according to an anti-collision process,
   wherein in response to the RFID inventory command, the RFID receiver receives a first plurality of responses from the plurality of RFID tags via the first plurality of antennas and a second plurality of responses from the plurality of RFID tags via the second plurality of antennas,
   wherein the controller determines an identifier for each of the plurality of RFID tags using at least one of the first plurality of responses and the second plurality of responses, and
   wherein the controller determines a position of each of the plurality of RFID tags by correlating information of the first plurality of responses, and information of the second plurality of responses, wherein the information includes at least one of phase information, amplitude information, and a combination of phase information and amplitude information.

2. The system of claim 1, further comprising:
   a multiplexer coupled to two or more antennas, and coupled to the RFID receiver, wherein the two or more antennas are selected from the first plurality of antennas and the second plurality of antennas,
   wherein the controller controls the multiplexer to selectively connect one of the two or more antennas to the RFID receiver.

3. The system of claim 1, further comprising:
   a multiplexer coupled to two or more of the plurality of main antennas, and coupled to the main RFID transmitter,
   wherein the controller controls the multiplexer to selectively connect one of the two or more antennas to the main RFID transmitter.

4. The system of claim 1, wherein at least one of the plurality of main antennas overlaps at least one other of the plurality of main antennas.

5. The system of claim 1, wherein each of the plurality of main antennas has a first loop, a second loop and a transition portion, wherein the transition portion is located at a side of the plurality of main antennas.

6. The system of claim 1, wherein each of the plurality of main antennas has a first loop, a second loop and a transition portion, wherein an area between each of the loops has a null, and wherein the first loop and the second loop define a non-null portion,
   wherein the plurality of main antennas are overlapping such that the null of one of the plurality of main antennas is at least partially covered by the non-null portion of at least one other of the plurality of main antennas.

7. A method of determining locations of objects in a gaming environment, the method comprising:
   generating, by a main radio frequency identification (RFID) transmitter coupled to a plurality of main antennas, an RFID inventory command, wherein the plurality of main antennas is associated with an area on a gaming table, and wherein each of the plurality of main antennas has a "figure 8" shape;
   responding, by each of a plurality of RFID tags in the area, to the RFID inventory command according to an anti-collision process;
   receiving, by an RFID receiver, a first plurality responses from the plurality of RFID tags via a first plurality of antennas in response to the RFID inventory command, wherein the first plurality of antennas is oriented in a first direction and is associated with the area on the gaming table;
   receiving, by the RFID receiver, a second plurality of responses from the plurality of RFID tags via a second plurality of antennas in response to the RFID inventory command, wherein the second plurality of antennas is oriented in a second direction that differs from the first direction, wherein the second plurality of antennas overlaps the first plurality of antennas, and wherein the first plurality of antennas and the second plurality of antennas intersect at a plurality of locations within the area;

determining, by a controller, an identifier for each of the plurality of RFID tags using at least one of the first plurality of responses and the second plurality of responses; and determining, by the controller, a position of each of the plurality of RFID tags by correlating information of the first plurality of responses, and information of the second plurality of responses, wherein the information includes at least one of phase information, amplitude information, and a combination of phase information and amplitude information.

8. A system for determining locations of objects in a gaming environment, the system comprising:
a main antenna associated with an area on a gaming table;
a plurality of antenna groups associated with the area on the gaming table, wherein an antenna group of the plurality of antenna groups includes a plurality of antennas having a "figure 8" shape, wherein the plurality of antennas in the antenna group are overlapping, and wherein the plurality of antennas in the antenna group have a reflected binary code arrangement;
a main radio frequency identification (RFID) transmitter coupled to the main antenna;
an RFID receiver; and
a controller that controls the main RFID transmitter to generate an RFID inventory command, wherein each of a plurality of RFID tags in the area responds to the RFID inventory command according to an anti-collision process,
wherein in response to the RFID inventory command, the RFID receiver receives a first plurality of responses from the plurality of RFID tags via the plurality of antenna groups,
wherein the controller determines an identifier for each of the plurality of RFID tags using the plurality of responses, and
wherein the controller determines a position of each of the plurality of RFID tags by correlating information of the plurality of responses, wherein the information includes phase information.

9. The system of claim 8, wherein each antenna group of the plurality of antenna groups overlaps at least one other antenna group of the plurality of antenna groups.

10. The system of claim 8, wherein a first antenna group of the plurality of antenna groups overlaps a second antenna group of the plurality of antenna groups.

11. The system of claim 8, wherein the information includes a combination of the phase information and amplitude information.

12. The system of claim 8, wherein an antenna in the antenna group has a first loop, a second loop, and a transition portion, wherein the controller determines the position of a particular RFID tag associated with the transition portion using a combination of the phase information and amplitude information.

13. The system of claim 8, wherein an antenna in the antenna group has a first loop, a second loop, and a transition portion, wherein the controller determines the position of a particular RFID tag associated with the transition portion using the phase information and amplitude information to perform an interpolation of the position.

14. The system of claim 8, wherein the main antenna has a "figure 8" shape.

15. The system of claim 8, wherein the main antenna is a plurality of main antennas, wherein each of the plurality of main antennas has a "figure 8" shape.

16. The system of claim 8, further comprising:
a multiplexer coupled to two or more antennas, and coupled to the RFID receiver, wherein the two or more antennas are selected from the plurality of antenna groups,
wherein the controller controls the multiplexer to selectively connect one of the two or more antennas to the RFID receiver.

17. The system of claim 8, wherein the plurality of antennas in the antenna group include a first antenna, a second antenna and a third antenna, wherein the first antenna has two loops and one transition portion, wherein the second antenna has three loops and two transition portions, and wherein the third antenna has five loops and four transition portions.

18. The system of claim 8, wherein the plurality of antennas in the antenna group has three antennas and provides eight location areas using only the phase information.

19. The system of claim 8, wherein the plurality of antennas in the antenna group has four antennas and provides sixteen location areas using only the phase information.

20. A method of determining locations of objects in a gaming environment, the method comprising:
generating, by a main radio frequency identification (RFID) transmitter coupled to a main antenna, an RFID inventory command, wherein the main antenna is associated with an area on a gaming table;
responding, by each of a plurality of RFID tags in the area, to the RFID inventory command according to an anti-collision process;
receiving, by an RFID receiver, a plurality responses from the plurality of RFID tags via a plurality of antenna groups in response to the RFID inventory command, wherein the plurality of antenna groups is associated with the area on the gaming table, wherein an antenna group of the plurality of antenna groups includes a plurality of antennas having a "figure 8" shape, wherein the plurality of antennas in the antenna group are overlapping, and wherein the plurality of antennas in the antenna group have a reflected binary code arrangement;
determining, by a controller, an identifier for each of the plurality of RFID tags using the plurality of responses; and
determining, by the controller, a position of each of the plurality of RFID tags by correlating information of the plurality of responses, wherein the information includes phase information.

* * * * *